(12) United States Patent
Laverick et al.

(10) Patent No.: US 7,440,845 B1
(45) Date of Patent: Oct. 21, 2008

(54) NAVIGATIONAL DEVICE FOR INSTALLATION IN A VEHICLE AND A METHOD FOR DOING SAME

(75) Inventors: David J. Laverick, Overland Park, KS (US); Brian G. Schoenfish, Kansas City, KS (US); Jeffrey D. Minelli, Olathe, KS (US)

(73) Assignee: Garmin Ltd. (KY)

( * ) Notice: Subject to any disclaimer, the term of this patent is extended or adjusted under 35 U.S.C. 154(b) by 320 days.

(21) Appl. No.: 10/790,382

(22) Filed: Mar. 1, 2004

Related U.S. Application Data

(63) Continuation-in-part of application No. 10/411,821, filed on Apr. 11, 2003, which is a continuation-in-part of application No. 10/397,662, filed on Mar. 26, 2003.

(51) Int. Cl.
*B60R 5/00* (2006.01)
(52) U.S. Cl. .................. 701/200; 296/37.8; 296/37.7; 296/24.34
(58) Field of Classification Search .............. 701/200, 701/209, 1, 49; 348/837; 296/37.7, 24.34, 296/24.1, 37.8, 26.01, 26.02, 26.03, 26.06, 296/166, 24.3, 26.14, 185.1, 107.06
See application file for complete search history.

(56) References Cited

U.S. PATENT DOCUMENTS

| | | | |
|---|---|---|---|
| 2,883,234 A | 4/1959 | Biondo | 696/37.9 |
| 3,946,826 A | 3/1976 | Guhl et al. | 180/90 |
| 4,105,246 A | 8/1978 | Trumbull | 296/97.7 |
| 4,194,585 A | 3/1980 | Prince | 180/90 |
| 4,241,870 A * | 12/1980 | Marcus | 296/37.7 |
| 4,552,399 A | 11/1985 | Atarashi | 298/37.12 |
| 4,619,386 A | 10/1986 | Richardson | 224/277 |
| 4,694,583 A | 9/1987 | Blaney | 33/361 |

(Continued)

FOREIGN PATENT DOCUMENTS

DE 3820510 A1 * 12/1989

(Continued)

OTHER PUBLICATIONS

A GPS III Owner's Manual & Reference Guide, Garmin Corporation, 1998.

(Continued)

*Primary Examiner*—Tuan C To
(74) *Attorney, Agent, or Firm*—Samuel M Korte

(57) ABSTRACT

A navigation assembly (5*l*) for mounting a navigational device (10*l*) in an open port (12*l*) of a vehicle resulting from removal of a non-navigational component is provided. The navigation assembly (5*l*) broadly comprises a mounting assembly (218*l*) and the navigational device (10*l*). The mounting assembly (218*l*) is mounted within the open port (12*l*), and the navigational device (10*l*) is fixedly or removably attached to the mounting assembly (218*l*), such that the navigational device (10*l*) may be linearly raised or lowered between two viewing positions that are in a general linear relationship to each other. The navigational device (10*l*) is operable to pivot left and right within the open port (12*l*). Additionally, a navigation assembly (5*m*) broadly comprising a mounting assembly (218*m*) and a navigational device (10*m*) for raising and lowering the navigational device (10*m*) among three viewing positions that are in a general linear relationship to each other is provided.

7 Claims, 18 Drawing Sheets

U.S. PATENT DOCUMENTS

| | | | |
|---|---|---|---|
| 4,793,648 A | 12/1988 | Zerilli | 296/37.12 |
| 4,824,159 A * | 4/1989 | Fluharty et al. | 362/492 |
| 4,867,498 A * | 9/1989 | Delphia et al. | 296/37.7 |
| 4,946,120 A | 8/1990 | Hatcher | 248/183.2 |
| 5,020,845 A | 6/1991 | Falcoff et al. | |
| 5,102,181 A | 4/1992 | Pinkney | 298/37.12 |
| 5,198,831 A | 3/1993 | Burrell et al. | 343/895 |
| 5,265,929 A * | 11/1993 | Pelham | 296/97.6 |
| 5,364,159 A | 11/1994 | Kelman et al. | 296/192 |
| 5,383,138 A | 1/1995 | Motoyama et al. | 361/683 |
| 5,415,554 A | 5/1995 | Kempkers et al. | |
| D366,220 S | 1/1996 | Sakamoto | D10/65 |
| 5,576,687 A * | 11/1996 | Blank et al. | 340/438 |
| 5,626,320 A | 5/1997 | Burrell et al. | 248/230.6 |
| 5,775,762 A * | 7/1998 | Vitito | 296/37.7 |
| 5,812,369 A | 9/1998 | Hsu et al. | 361/683 |
| 5,859,628 A | 1/1999 | Ross et al. | |
| 5,859,762 A | 1/1999 | Clark et al. | 361/686 |
| 5,865,403 A | 2/1999 | Covell | 248/27.1 |
| D409,927 S | 5/1999 | Wiegers et al. | |
| 5,910,882 A | 6/1999 | Burrell | 361/681 |
| 5,917,435 A * | 6/1999 | Kamiya et al. | 340/995.26 |
| D417,201 S | 11/1999 | Davis | D14/343 |
| 5,996,866 A | 12/1999 | Susko et al. | |
| 6,086,129 A | 7/2000 | Gray | 296/37.8 |
| 6,094,341 A | 7/2000 | Lin | 361/681 |
| 6,095,470 A | 8/2000 | Kalis | 248/309.1 |
| 6,097,448 A * | 8/2000 | Perkins | 348/837 |
| 6,102,284 A | 8/2000 | Myers et al. | |
| 6,111,964 A | 8/2000 | Ishibashi | |
| 6,125,030 A | 9/2000 | Mola et al. | |
| 6,140,933 A | 10/2000 | Bugno et al. | |
| 6,165,002 A | 12/2000 | Kalis | 439/358 |
| 6,173,933 B1 | 1/2001 | Whiteside et al. | 248/276.1 |
| D438,841 S | 3/2001 | Smith | D12/424 |
| 6,267,428 B1 | 7/2001 | Baldas et al. | 296/37.7 |
| 6,273,310 B1 | 8/2001 | Gregory | 224/275 |
| 6,295,038 B1 | 9/2001 | Rebeske | 345/1.1 |
| 6,338,517 B1 | 1/2002 | Canni et al. | 296/37.8 |
| D453,300 S | 2/2002 | Schoenfish et al. | |
| D453,477 S | 2/2002 | Schoenfish et al. | |
| 6,345,179 B1 | 2/2002 | Wiegers et al. | 455/344 |
| 6,370,037 B1 | 4/2002 | Schoenfish | |
| 6,370,741 B1 * | 4/2002 | Lu | 24/523 |
| D457,445 S | 5/2002 | Schoenfish | |
| 6,386,965 B1 | 5/2002 | Greenwald et al. | 454/75 |
| 6,392,877 B1 | 5/2002 | Iredale | 361/683 |
| D459,249 S | 6/2002 | Schoenfish et al. | |
| 6,409,242 B1 * | 6/2002 | Chang | 296/37.7 |
| 6,411,502 B1 | 6/2002 | Burrell | 361/681 |
| 6,412,848 B1 | 7/2002 | Ceccanese et al. | 296/37.7 |
| 6,427,959 B1 | 8/2002 | Kalis et al. | 248/288.11 |
| 6,428,072 B1 | 8/2002 | Moore | 396/24.34 |
| 6,464,185 B1 | 10/2002 | Minelli et al. | 248/183.1 |
| 6,477,391 B1 | 11/2002 | Muramatsu et al. | |
| 6,482,082 B1 | 11/2002 | Derleth et al. | 454/156 |
| 6,493,915 B2 | 12/2002 | Zonneveld et al. | 29/401.1 |
| 6,505,121 B1 | 1/2003 | Russell | |
| 6,529,381 B1 | 3/2003 | Schoenfish | |
| 6,633,347 B2 | 10/2003 | Kitazawa | 348/837 |
| 6,636,918 B1 | 10/2003 | Aguilar et al. | 710/207 |
| 6,650,884 B1 | 11/2003 | Wiegers et al. | 455/344 |
| 6,663,064 B1 | 12/2003 | Minelli et al. | 248/205.5 |
| 6,681,176 B2 | 1/2004 | Funk | 701/207 |
| 6,709,041 B1 | 3/2004 | Hotary et al. | 296/70 |
| 6,758,510 B1 | 7/2004 | Starling | |
| 6,810,735 B2 | 11/2004 | Kaneko et al. | 73/493 |
| 6,827,284 B2 | 12/2004 | Ichishi et al. | |
| 6,928,366 B2 | 8/2005 | Ockerse et al. | |
| D509,760 S | 9/2005 | Burrell et al. | D10/65 |
| 6,955,279 B1 | 10/2005 | Mudd et al. | 224/197 |
| 6,966,533 B1 | 11/2005 | Kalis et al. | 248/316.4 |
| 6,976,916 B2 | 12/2005 | Burrell et al. | 463/1 |
| D531,920 S | 11/2006 | Mudd et al. | D10/65 |
| 7,142,980 B1 | 11/2006 | Laverick et al. | 701/213 |
| 7,154,383 B2 | 12/2006 | Berquist | 340/425.5 |
| 2001/0040109 A1 | 11/2001 | Yaski et al. | |
| 2001/0042990 A1 | 11/2001 | Ito et al. | 296/70 |
| 2001/0047899 A1 | 12/2001 | Ikeda | 180/90 |
| 2002/0003354 A1 | 1/2002 | Inoue et al. | 296/70 |
| 2002/0044411 A1 | 4/2002 | Iredale | 361/683 |
| 2002/0075136 A1 * | 6/2002 | Nakaji et al. | 340/425.5 |
| 2002/0085129 A1 | 7/2002 | Kitazawa | 348/837 |
| 2002/0113451 A1 * | 8/2002 | Chang | 296/37.7 |
| 2002/0133276 A1 | 9/2002 | Onodera | 701/36 |
| 2002/0138180 A1 | 9/2002 | Hessing et al. | |
| 2002/0149708 A1 * | 10/2002 | Nagata et al. | 348/837 |
| 2002/0152027 A1 | 10/2002 | Allen | 701/213 |
| 2002/0163219 A1 | 11/2002 | Clark et al. | |
| 2002/0183921 A1 | 12/2002 | Suglyama et al. | 701/200 |
| 2003/0055556 A1 * | 3/2003 | Hashida | 701/207 |
| 2003/0090371 A1 | 5/2003 | Toewee et al. | |
| 2003/0127878 A1 | 7/2003 | Gort et al. | |
| 2003/0137543 A1 * | 7/2003 | Anderson et al. | 345/771 |
| 2003/0151664 A1 * | 8/2003 | Wakimoto et al. | 348/148 |
| 2003/0168875 A1 | 9/2003 | Anderson et al. | |
| 2003/0184111 A1 | 10/2003 | Sturt | 296/37.8 |
| 2003/0184411 A1 | 10/2003 | Sturt | |
| 2003/0188103 A1 | 10/2003 | Edwards et al. | |
| 2003/0208314 A1 * | 11/2003 | Funk et al. | 701/207 |
| 2003/0214474 A1 | 11/2003 | Aoki et al. | 345/87 |
| 2004/0024522 A1 | 2/2004 | Walker et al. | 701/210 |
| 2004/0026947 A1 | 2/2004 | Kitano et al. | |
| 2004/0041499 A1 | 3/2004 | Donovan et al. | |
| 2004/0196179 A1 | 10/2004 | Turnball | |
| 2004/0204840 A1 | 10/2004 | Hashima et al. | 701/209 |
| 2004/0206796 A1 | 10/2004 | Badillo et al. | |
| 2005/0177350 A1 * | 8/2005 | Kishkawa | 703/1 |
| 2007/0279856 A1 | 12/2007 | Bragg | 361/683 |

FOREIGN PATENT DOCUMENTS

| | | |
|---|---|---|
| GB | 2405049 | 8/2003 |
| JP | 6-230104 | 8/1994 |
| JP | 09224202 A * | 8/1997 |
| JP | 09309389 A * | 12/1997 |

OTHER PUBLICATIONS

A GPSMAP 130 Owner's Manual and Reference, Garmin International, 1998.

* cited by examiner

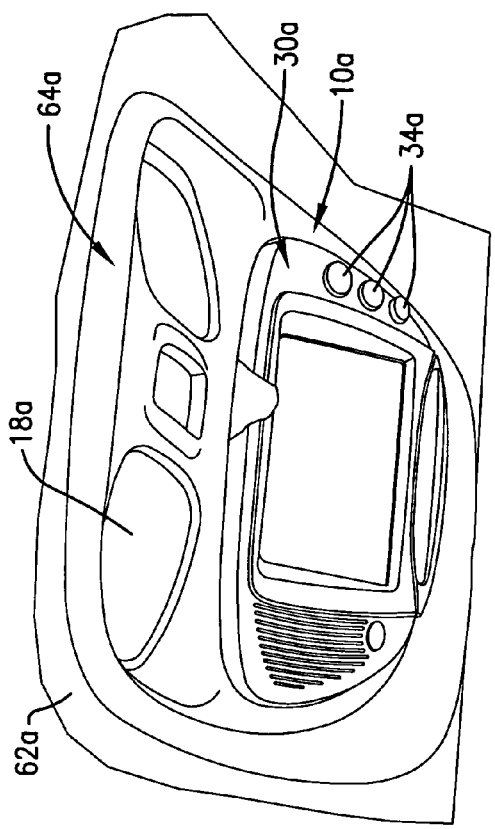
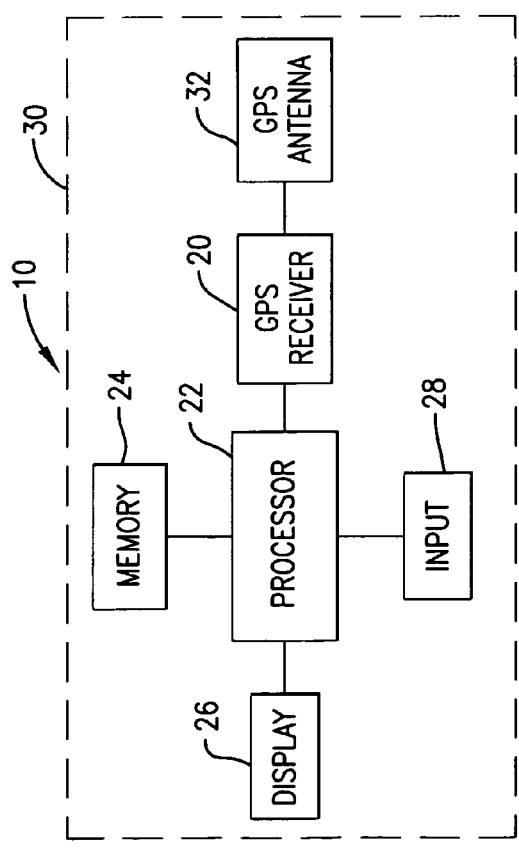
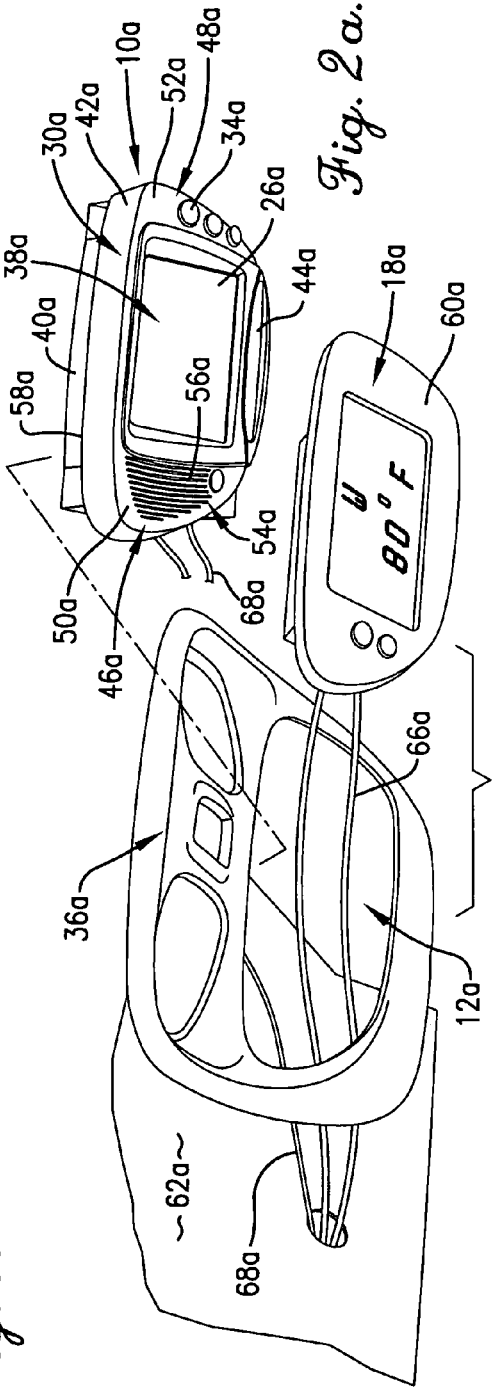

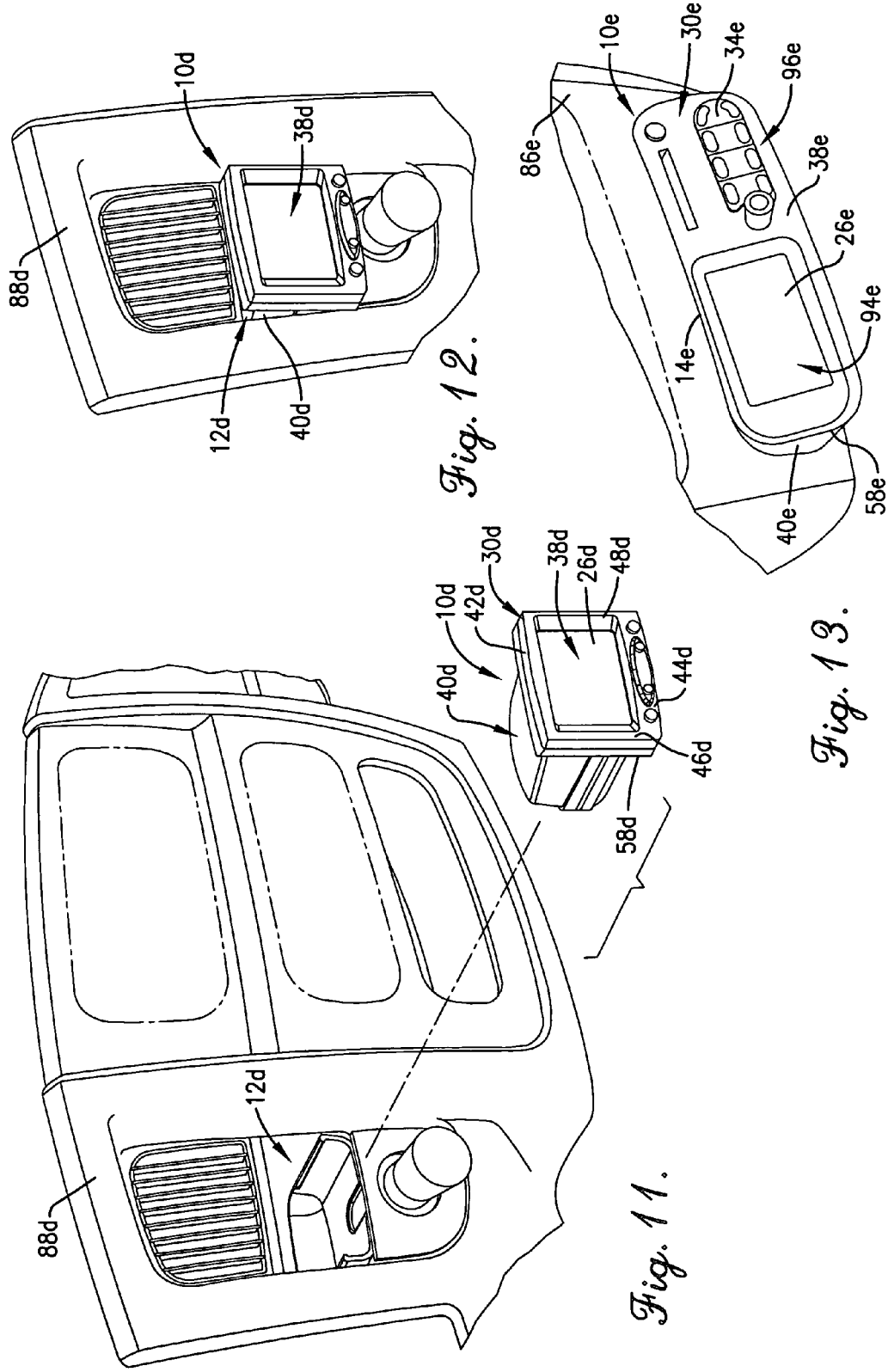

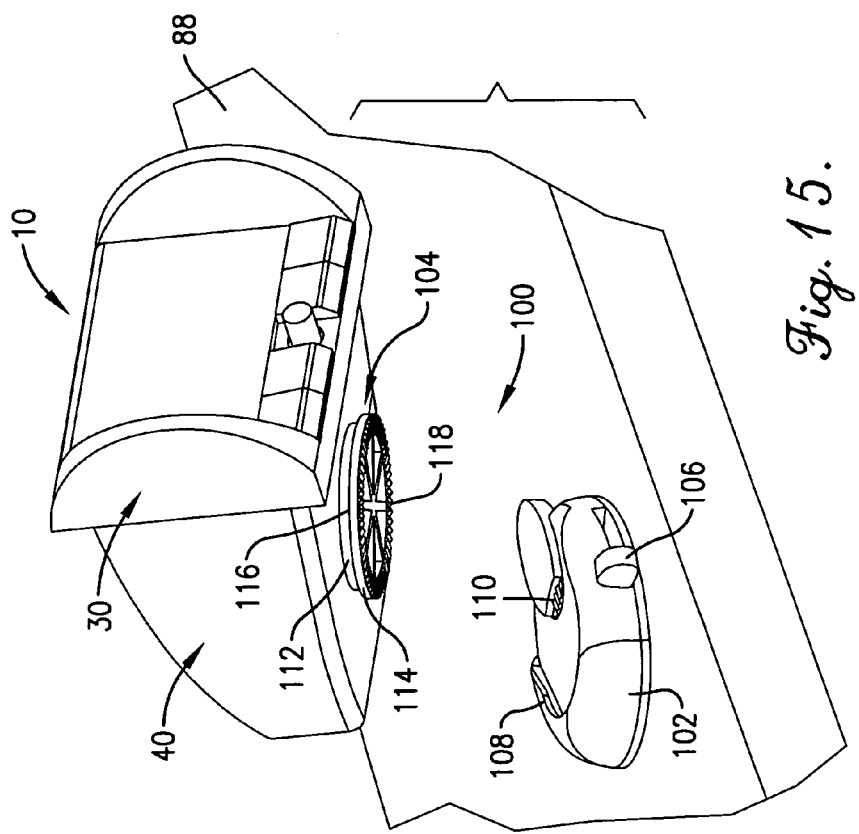
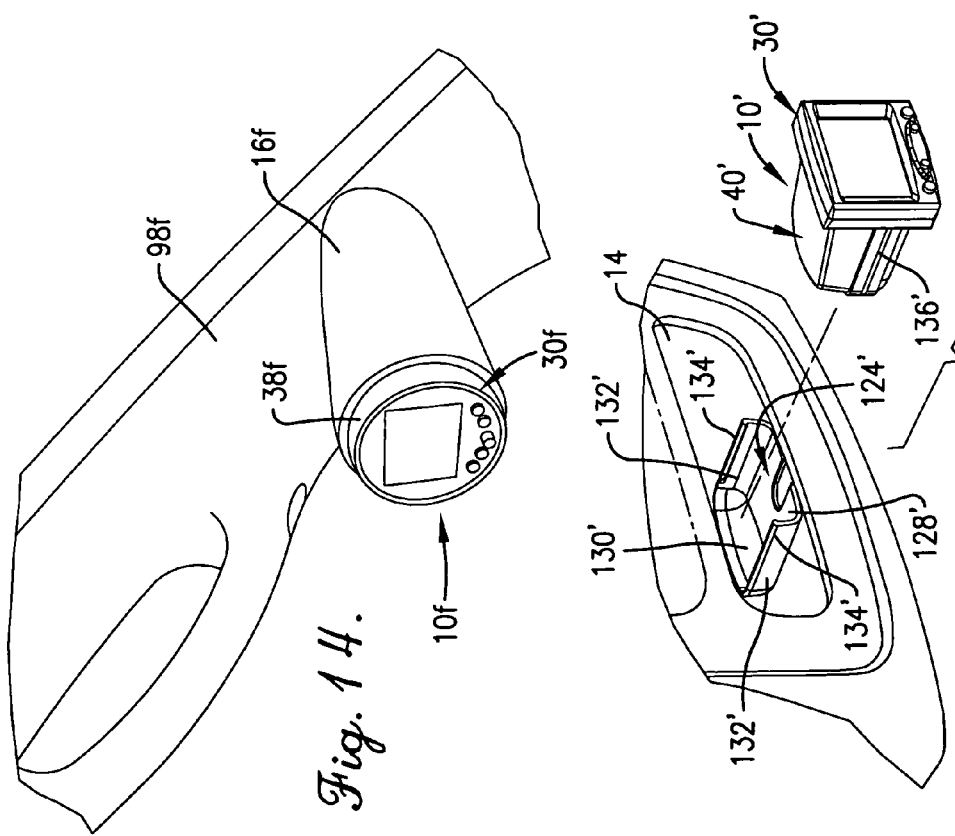

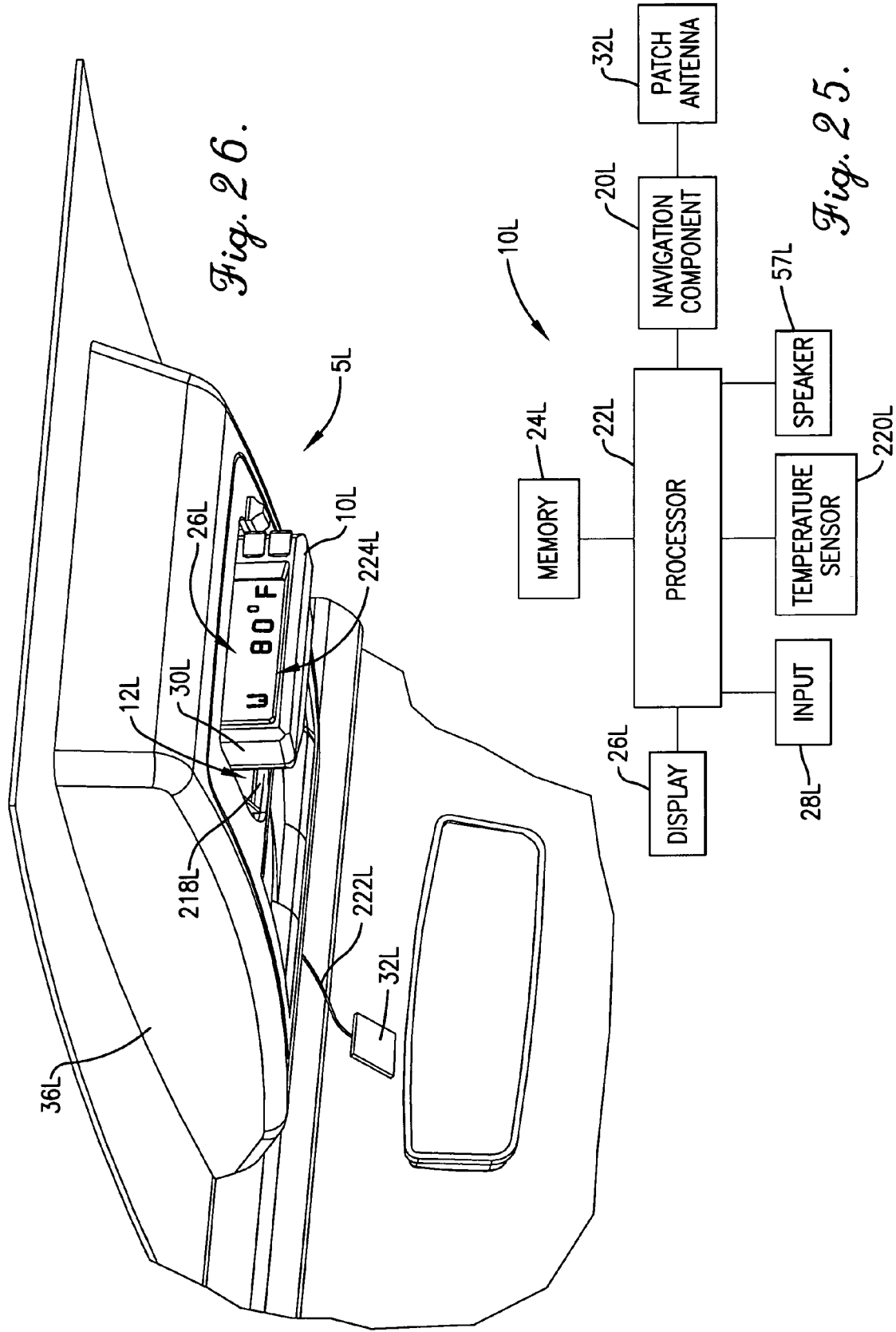

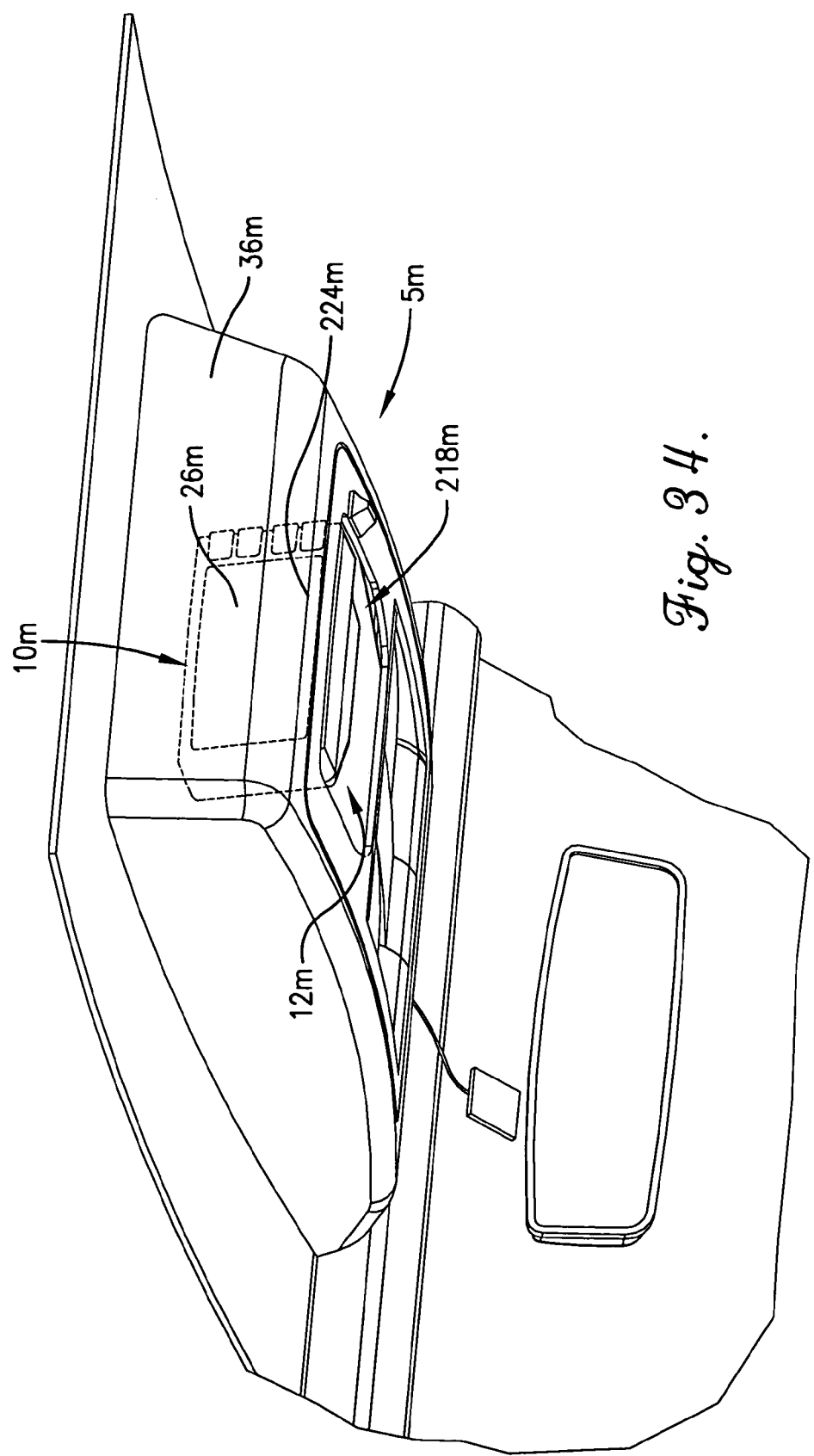

NAVIGATIONAL DEVICE FOR INSTALLATION IN A VEHICLE AND A METHOD FOR DOING SAME

RELATED APPLICATIONS

The present application is a continuation-in-part and claims priority benefit, with regard to all common subject matter, of U.S. application Ser. No. 10/411,821, filed Apr. 11, 2003, and titled "A NAVIGATIONAL DEVICE FOR INSTALLATION IN A VEHICLE AND A METHOD FOR DOING SAME," which is a continuation-in-part and claims priority benefit, with regard to all common subject matter, of U.S. application Ser. No. 10/397,662, filed Mar. 26, 2003, and titled "A NAVIGATIONAL DEVICE FOR INSTALLATION IN A VEHICLE AND A METHOD FOR DOING SAME." The identified earlier-filed applications are hereby incorporated by reference into the present application.

The above applications are all related to co-pending U.S. application Ser. No. 10/663,045, filed Sep. 13, 2003, and titled "A NAVIGATIONAL DEVICE FOR MOUNTING ON A SUPPORT PILLAR OF A VEHICLE AND A METHOD FOR DOING SAME," and U.S. application Ser. No. 10/663,044, filed Sep. 13, 2003, and titled "A NAVIGATIONAL DEVICE FOR INSTALLATION IN A VEHICLE AND A METHOD FOR DOING SAME," both of which are herein incorporated into the present application by reference.

BACKGROUND OF THE INVENTION

1. Field of the Invention

The present invention relates to navigational devices. More particularly, the invention relates to navigational devices for use in vehicles not originally equipped with nor designed for a navigational device.

2. Description of the Prior Art

Navigational devices, such as global positioning satellite ("GPS") units, are becoming increasingly popular options in automobiles and other vehicles. Such navigational devices can determine a vehicle's current location, display a city map or other driving area, and provide directions.

Many luxury vehicles are now either originally equipped with navigational devices or are designed to accept original equipment manufacture ("OEM") navigational devices as a dealer option. However, the popularity of navigational devices has spread beyond those who can afford luxury vehicles. Unfortunately, vehicle manufacturers have been slow to add factory or dealer-installed navigational devices to lower-priced vehicles, because it often takes three to six years to implement a design change in a vehicle model. Also, since implementing such a design change can be extremely expensive, it has been thus far impractical and too expensive to equip many vehicles with OEM navigational devices.

Those wishing to use a navigational device in a vehicle that is not equipped with nor configured to receive such a device often choose to use a portable, hand-held navigational device. One such navigational device is sold by Garmin International, Inc., under the trade name ETREX. These navigational devices are usually intended to be used in a multiplicity of locations, one of which may be the vehicle. However, because these navigational devices are not specially designed for use in vehicles, users are forced to store the navigational devices in a glove compartment, a vehicle console, an empty passenger seat, or on a dashboard. Each of these locations presents accessibility and viewing problems. For example, if the navigational device is tossed onto the dashboard of the vehicle, it can slide around, causing damage to the device and the vehicle. Additionally, use of the device requires a user to hold it in one hand and drive with the other hand, clearly causing safety concerns and problems. Furthermore, the portable navigational device may become lost in the many open spaces and cracks of the vehicle.

Mounts have been designed to attach handheld navigational devices to vehicle dashboards to alleviate some of these problems. However, such mounts often obstruct the view of the driver and/or passenger of the vehicle. Additionally, the mounts clutter the dashboard of the vehicle and are not aesthetically pleasing. Further, mounts permanently installed on the dashboard leave holes and other scarring marks. If the mount is removably installed on the dashboard, it often becomes loose due to the vibrations of the vehicle.

Accordingly, there is a need for an improved navigational device that overcomes the limitations of the prior art. More particularly, there is a need for a navigational device that can be used in a vehicle not originally equipped with a navigational device without need for a dashboard mount. Additionally, there is a need for a navigational device that is easily accessible and viewable by a driver of the vehicle.

SUMMARY OF THE INVENTION

The present invention solves the above-described problems and provides a distinct advance in the art of navigational devices. More particularly, the present invention provides a navigational device that may be removably or permanently mounted in a vehicle not designed to receive a navigational device, without requiring use of a dashboard mount.

The navigational device of the present invention broadly includes a navigation component such as a global positioning satellite ("GPS") receiver; a processor coupled with the navigation component; a memory coupled with the processor; a display; an input; and a housing for housing the navigation component, the processor, and the memory. The housing is importantly sized and configured to be removably mounted in an open port or existing opening of a vehicle. Due to the many different makes and models of vehicles, the housing of the navigational device consequently embodies a plurality of sizes and shapes.

In other embodiments, the navigational device is a conventional, portable navigational device and thus, is not particularly sized and configured to fit within an existing location or open port of the vehicle.

In a first preferred embodiment of the present invention, the open port results from removal of a non-navigational component in an overhead console of the vehicle. The overhead console may be any standard overhead console formed during manufacture of the vehicle and positioned on an interior roof section of the vehicle. The overhead console houses at least one non-navigational component, such as a display screen displaying an outside temperature and bearing of the vehicle. The non-navigational component is removed from the overhead console, leaving the open port. The navigational device, which is sized and configured to the dimensions of the open port, is then mounted or installed in the open port.

Alternatively, the overhead console itself may be removed from the vehicle, leaving an open area. A replacement overhead console sized and configured to fit within the open area resulting from removal of the first original overhead console is then installed in the open area. The replacement overhead console is substantially the same size and shape as the overhead console and includes the navigational device.

In a second preferred embodiment, an open port results from removal of an air vent unit installed in the vehicle. Similar to the first preferred embodiment, a navigational device is sized and configured to the dimensions of the open port. The housing of this embodiment is provided with insulation to protect the navigational device from excessive temperatures created by the vehicle's heating and cooling system. Further, an air grate or vent may be provided around a front face of the housing to minimize potential air flow noise resulting from removal of the air vent unit.

In a third preferred embodiment, an open port results from removal of a non-navigational component in a middle console of the vehicle. The middle console is positioned directly under a dashboard of the vehicle and generally center of the vehicle. Similar to the first preferred embodiment, a navigational device is sized and configured to the dimensions of the open port, so it may replace the non-navigation component in the middle console.

In a fourth preferred embodiment, an open port results from removal of a non-navigational component in the dashboard of the vehicle. Similar to the first preferred embodiment, a navigational device is sized and configured to the dimensions of the open port, so it may replace the non-navigation component in the dashboard.

In a fifth preferred embodiment, an empty recess formed during manufacture of the vehicle is located. The empty recess may be, for example, a recess designed to hold objects such as eyeglasses, compact discs, a compact disc player, a garage door opener, or other miscellaneous articles. A navigational device, which is sized and configured to fit within the empty recess, is then mounted in the empty recess.

In a sixth preferred embodiment, a hollowed receptacle is secured on a pillar of a door frame of the vehicle. A navigational device, which is sized and configured to fit within the hollowed receptacle, is then mounted in the hollowed receptacle. Alternatively, the pillar is replaced with a substantially similar replacement pillar that includes the navigational device mounted in the hollowed receptacle.

In a seventh preferred embodiment, an open port results from removal of a non-navigation component in an overhead console of a vehicle. A navigational device sized and configured to fit within the open port is pivotably or rotatably mounted with the open port. The navigational device is then operable to pivot or rotate downwards to an optimal viewing position or angle.

In an eighth preferred embodiment, an open port results from removal of a non-navigation component in an overhead console of a vehicle, and a mounting unit sized and configured to fit within the open port is secured within the open port. The mounting unit is operable to removably receive a navigational device sized and configured to fit within the mounting unit. Additionally, the mounting unit is operable to rotate downwards to allow viewing of the navigational device in an optimal viewing position or angle. Further, the mounting unit and received navigational device are operable to fold or nest within the open port so as to hide the navigational device from view.

Ninth and tenth preferred embodiments are disclosed in U.S. application Ser. No. 10/663,044, filed Sep. 13, 2003, which is also incorporated herein by reference. An eleventh preferred embodiment is disclosed in U.S. application Ser. No. 10/663,045, filed Sep. 13, 2003, and further incorporated herein by reference.

In a twelfth preferred embodiment, a navigation assembly for mounting in an open port resulting from removal of a non-navigational component is provided. The navigation assembly comprises a mounting assembly and a navigational device, wherein the mounting assembly is mounted within the open port, and the navigational device is fixedly or removably attached to the mounting assembly. The mounting assembly is configured to position the navigational device in a plurality of viewing positions within the open port. In particular, the mounting assembly permits the navigational device to be positioned in a raised position, such that approximately two-thirds of the navigational device is stowed within the open port. When in the raised positioned, a lower portion of a display of the navigational device can still be viewed by a user. Alternatively, the mounting assembly permits the navigational device to be positioned in a lowered position, such that approximately two-thirds or more of the navigational device is positioned outside the open port, and substantially all of the display can be viewed by the user. Neither the raised nor the lowered positions obstruct the user's view in a rearview mirror.

In contrast to the prior preferred embodiments, the mounting assembly moves the navigational device between the raised and lowered positions in a generally linear direction, rather than pivoting or rotating the navigational device into the open port.

The mounting assembly of the twelfth preferred embodiment may also be configured to pivot the navigational device left and right about a generally transverse axis and in either viewing position to facilitate viewing by the user or other passenger in the vehicle.

A thirteenth preferred embodiment is substantially similar to the twelfth preferred embodiment, except that a mounting assembly is configured to move a navigational device in a generally linear direction among three viewing positions. In a first, stowed position, a display of the navigational device is substantially stowed within the open port. Similar to the twelfth embodiment, in a second, intermediate position, approximately one-thirds of the display may be viewed, and in a third, lowered position, approximately all of the display may be viewed.

In each of these embodiments and other embodiments described herein, the navigational device may be permanently mounted in the open port, empty recess, or hollowed receptacle or removably mounted therein. Moreover, the navigational device may be provided with wires or adapters for connecting to the vehicle's power source and/or other electronic components in the vehicle, such as a display screen or vehicle computer. Alternatively, the navigational device may use wires or adapters of the removed non-navigational component to connect the navigational device to the power source or the other electronic components. Further, the navigational device may be provided with at least one battery for powering the navigational device.

By constructing the navigational device as described herein, numerous advantages are realized. For example, because the navigational device is sized and configured to replace a non-navigational component originally installed in a vehicle, it may be installed in any vehicle, regardless of whether the vehicle was designed to receive such a device. Moreover, the navigational device may be installed at any time, not just during manufacture of the vehicle or at the dealer when the vehicle is sold. Thus, a user of the vehicle need not purchase a luxury automobile to enjoy the benefits of a navigational device installed in the vehicle.

Further, the navigational device may be mounted or installed in the vehicle without replacing the dashboard or the middle console of the vehicle. Since replacing the dashboard or the middle console of the vehicle is clearly expensive, the present invention provides an inexpensive alternative to installing a navigational device in a vehicle.

Additionally, because the navigational device is designed to replace a component which was designed to be viewed and/or operated by a user, the navigational device will typically be positioned in an easily accessible and viewable area. This limits the unsafe practice of holding the navigational device while driving. Further, the navigational device and the vehicle are not harmed from the navigational device being tossed around within the vehicle.

Furthermore, because the housing of the navigational device is designed to match the dimensions of the open port, empty recess, or hollowed receptacle so as to fit substantially within the open port, empty recess, or hollowed receptacle, installation of the navigational device does not adversely affect the aesthetics of the vehicle.

The twelfth and thirteenth preferred embodiments provide particular advantages because the navigational device may be fixedly or removably attached within the open port without obstructing the user's view in a rearview mirror, yet still positioned for continual viewing and monitoring by the user. Additionally, both embodiments provide a position whereby a lower portion of the display of the navigational device can be seen by the user for viewing navigation or other information, while a portion of the display is stowed in the open port.

Further, unlike prior embodiments, the mounting assembly positions the navigational device generally linearly, as opposed to pivoting the navigational device into the viewing positions. This allows the navigational device to be positioned in more than one viewing position. Otherwise, if pivoted within the mounting assembly, the navigational device may be only either fully stowed within the mounting assembly or pivoted down to the viewing position.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a block diagram of the components of a navigational device constructed in accordance with a first, second, third, fourth, fifth, sixth, seventh, and eighth preferred embodiments of the present invention;

FIG. 2*a* is an exploded fragmentary isometric view of the first preferred embodiment of the present invention illustrating a non-navigational component housed in an open port of an overhead console and a navigational device sized and configured to be mounted within the open port;

FIG. 2*b* is a fragmentary isometric view of a replacement overhead console including the navigational device, particularly illustrating the replacement console having substantially the same size and shape as the overhead console of FIG. 1*a*;

FIG. 11 is an exploded fragmentary isometric view of the fourth preferred embodiment of the present invention illustrating a navigational device installed in an open port resulting from removal of a non-navigational component in a dashboard of the vehicle, particularly illustrating the navigational device adapted to be removably mounted in the open port via a cradle;

FIG. 12 is a fragmentary isometric view of the navigational device of FIG. 11 shown removably mounted within the open port;

FIG. 13 is a fragmentary isometric view of the fifth preferred embodiment of the present invention, particularly illustrating a navigational device inserted within an empty recess originally empty;

FIG. 14 is a fragmentary isometric view of the sixth preferred embodiment of the present invention illustrating a navigational device mounted within a hollowed receptacle secured on a pillar of a door frame of the vehicle;

FIG. 15 is an isometric view depicting the navigational device of FIG. 6 being removably mounted on the dashboard of the vehicle, particularly illustrating a second mounting unit for removably mounting the navigational device on the dashboard;

FIG. 16 is an exploded fragmentary view of the navigational device of FIGS. 11 and 12 mounted in an open port, particularly illustrating the navigational device removably mounted within the open port via a cradle;

Figure 18:
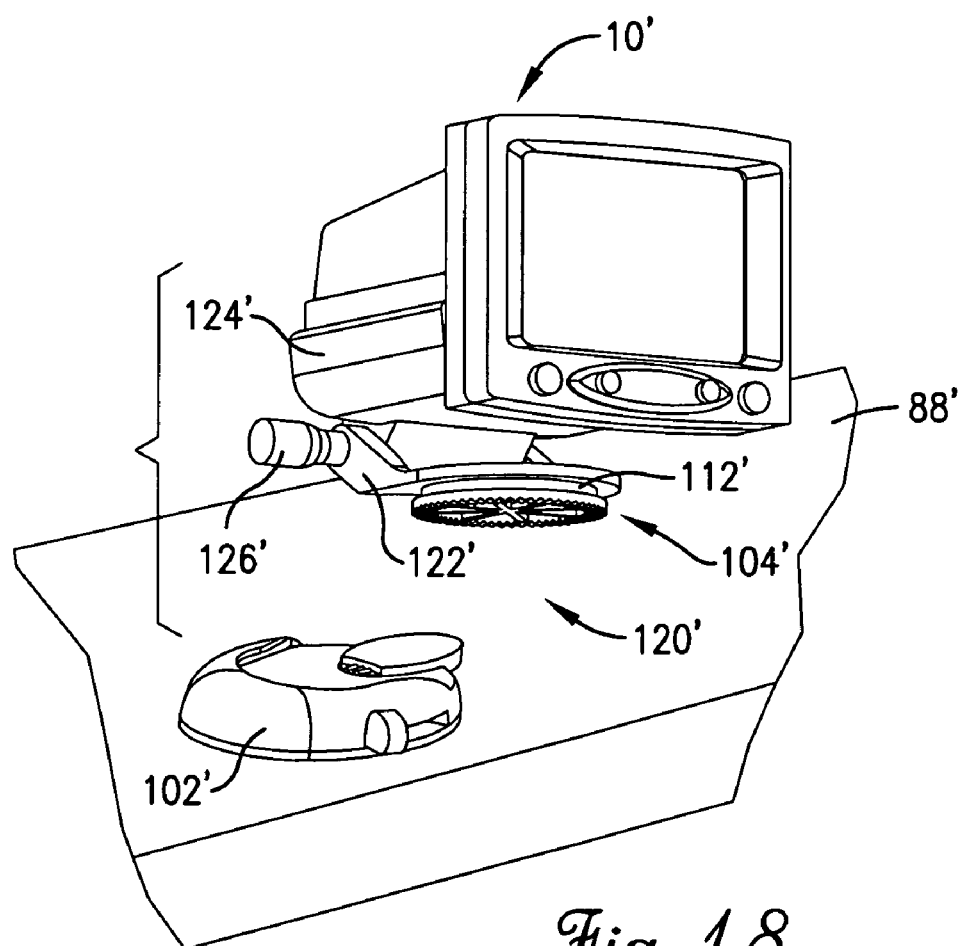
Figure 19:
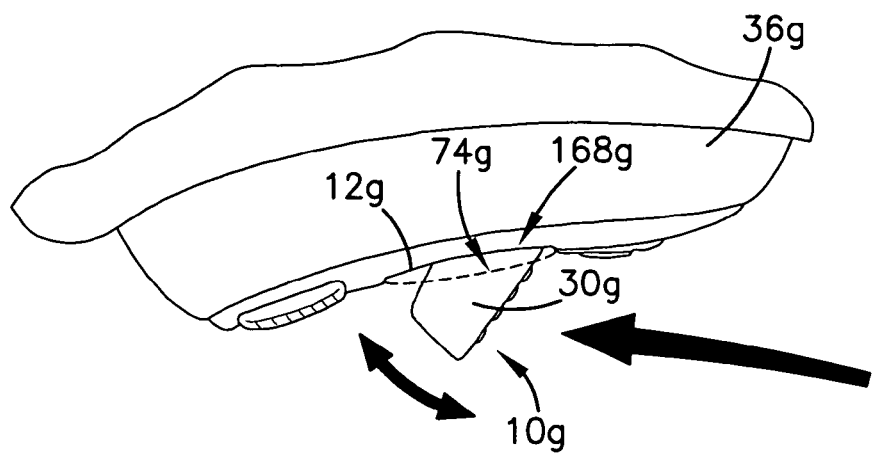
Figure 20:
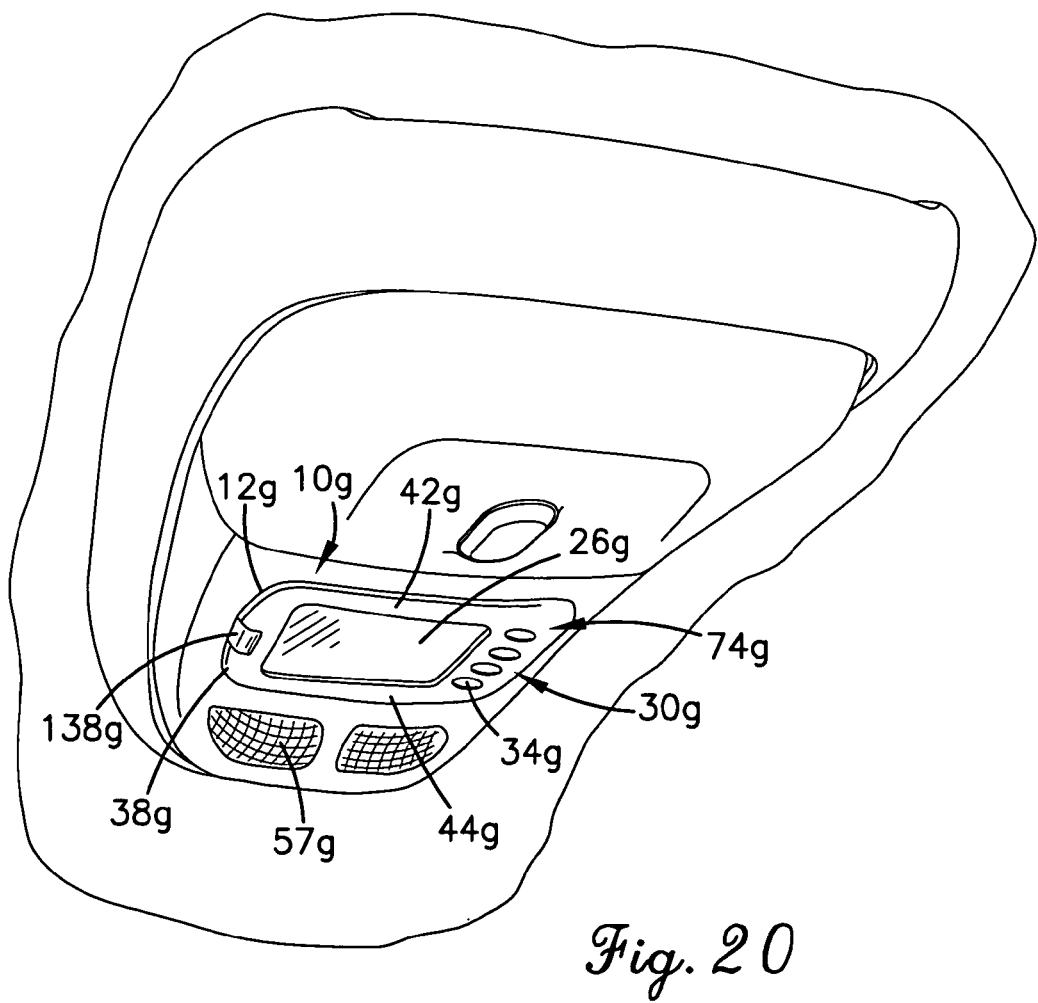
Figure 21:
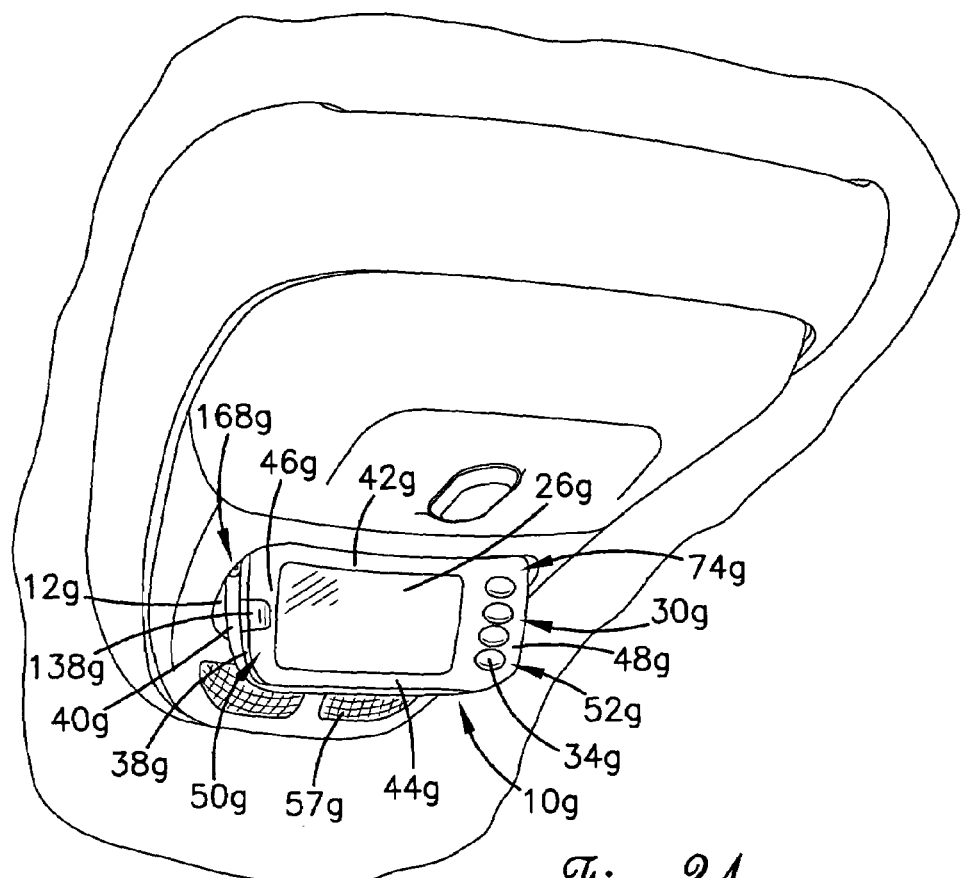
Figure 22:
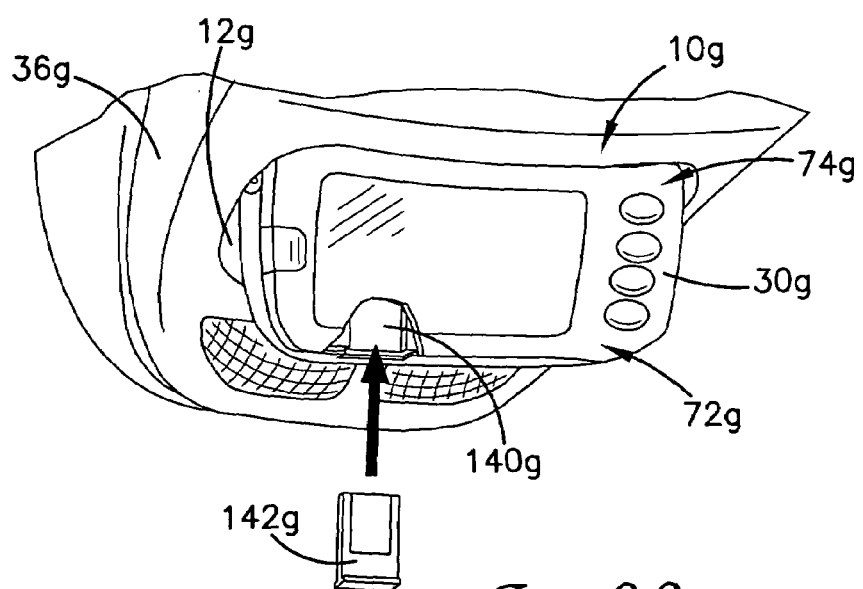
Figure 23:
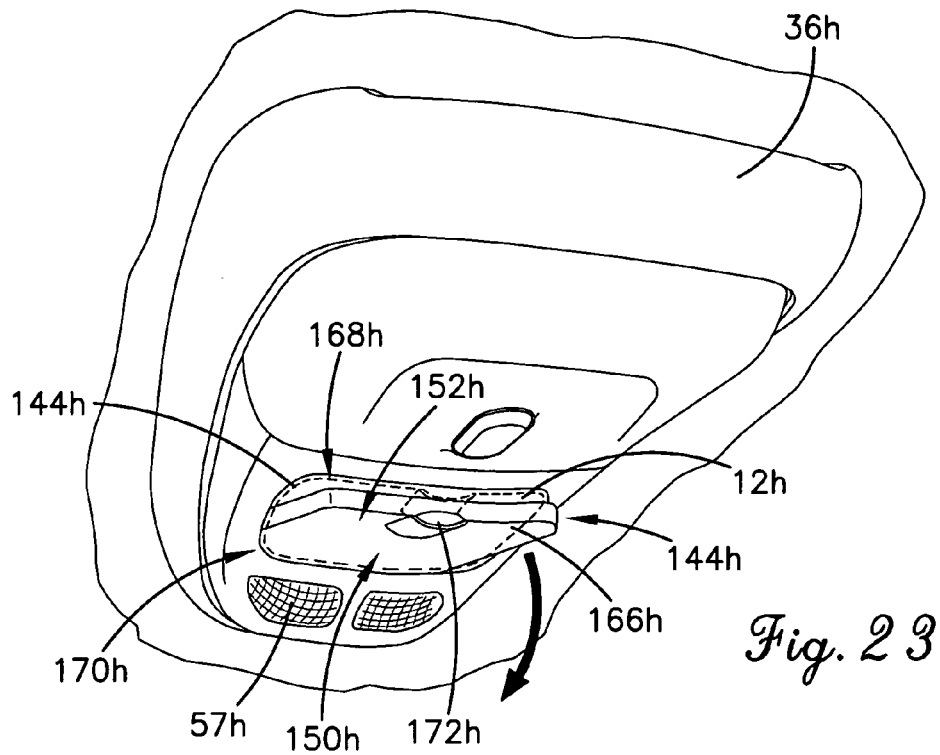
Figure 24:
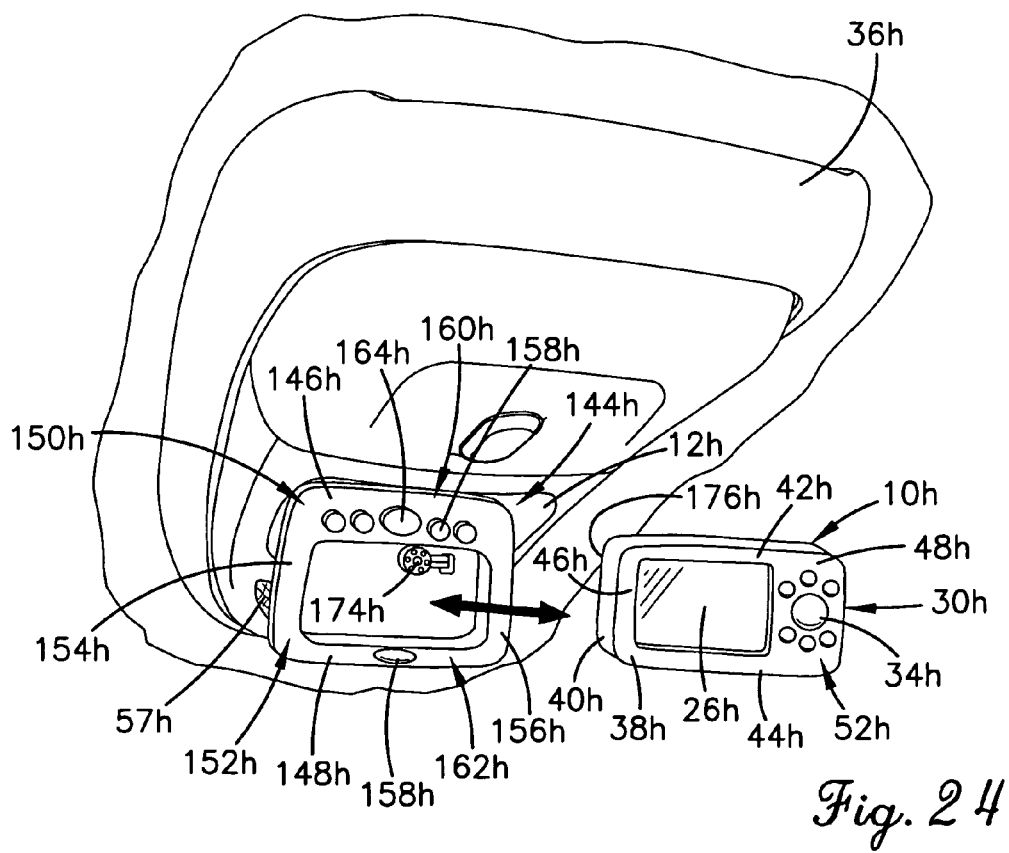
Figure 27:
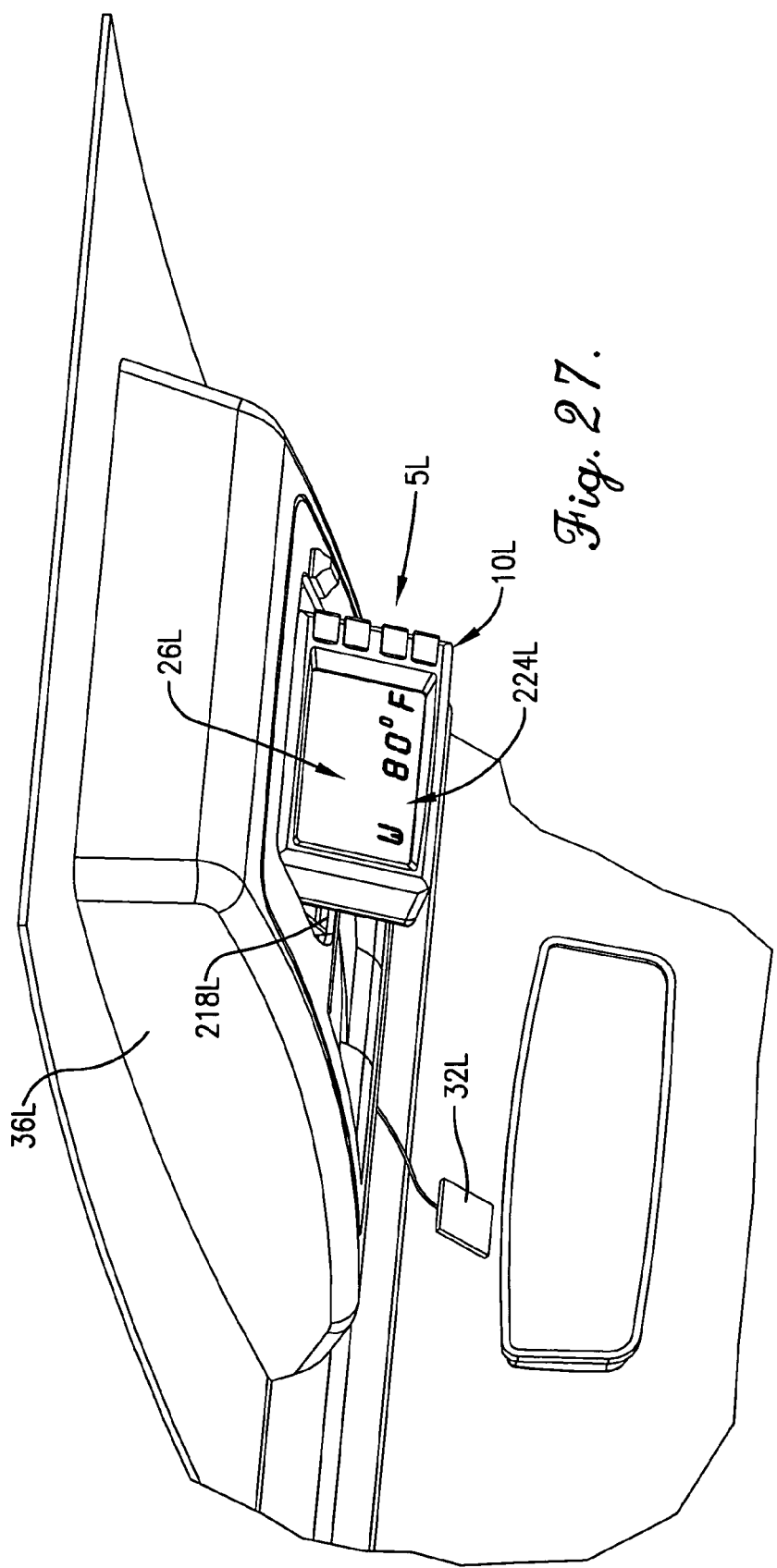
Figure 28:
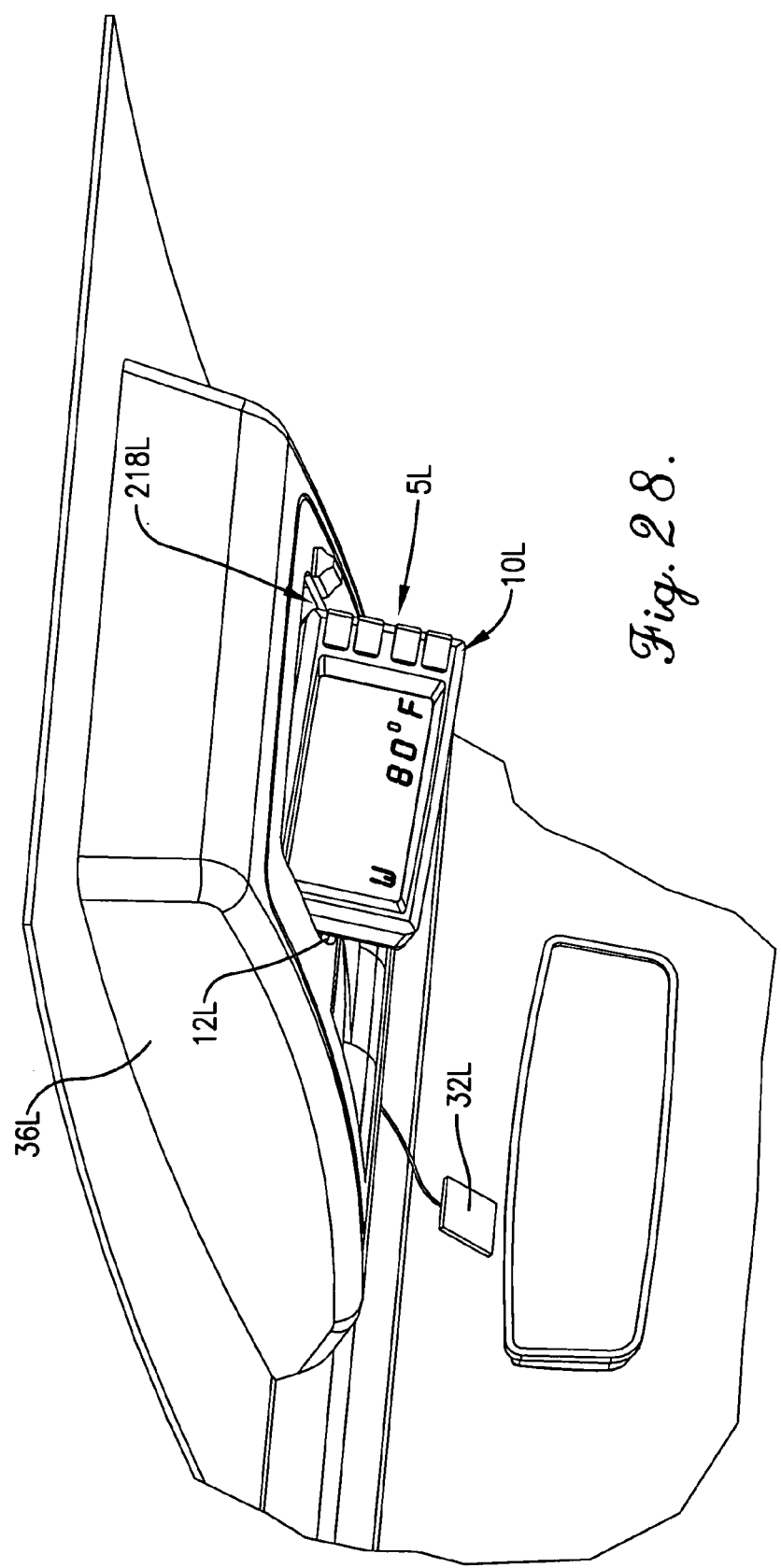
Figure 29:
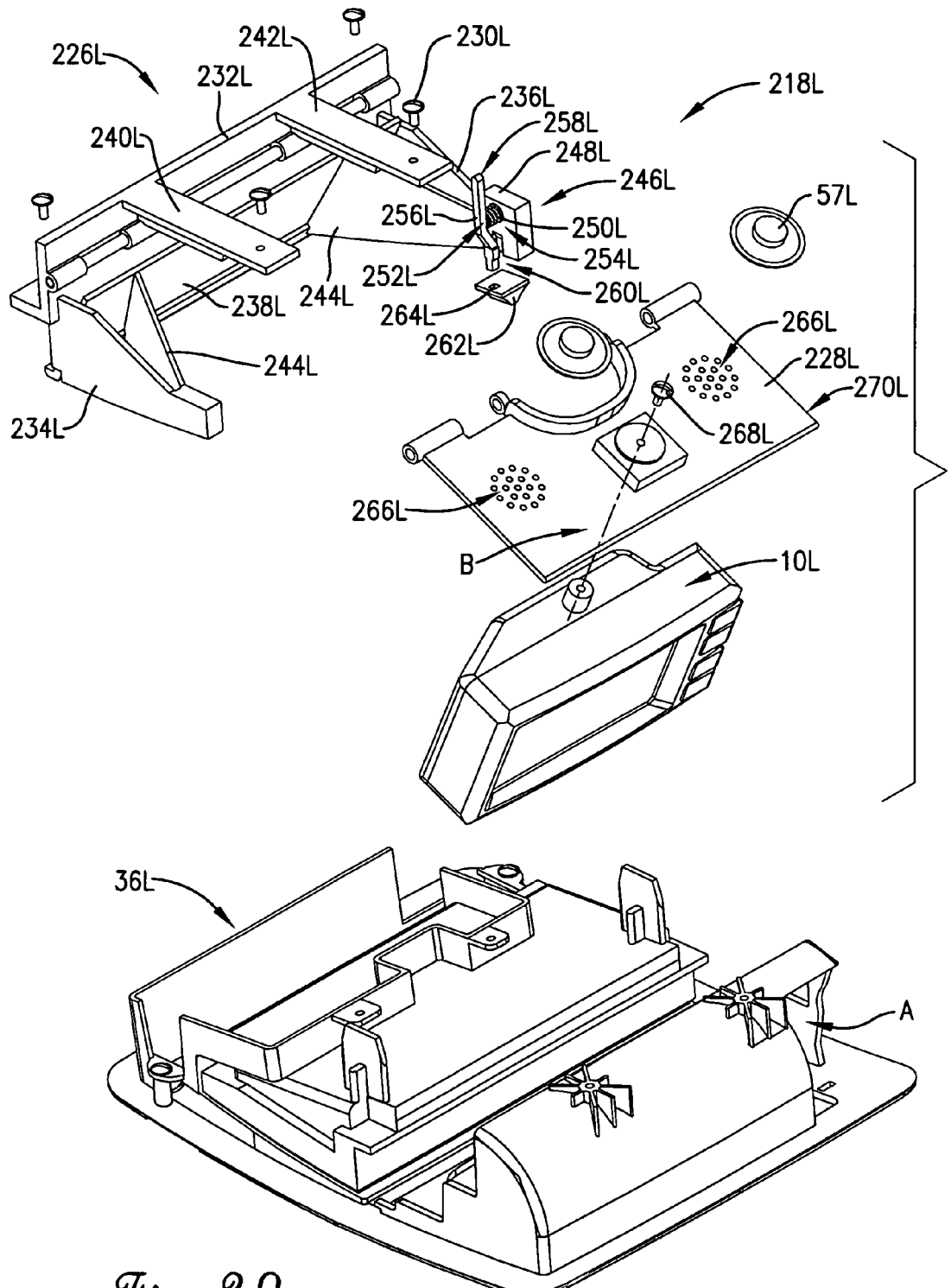
Figure 30:
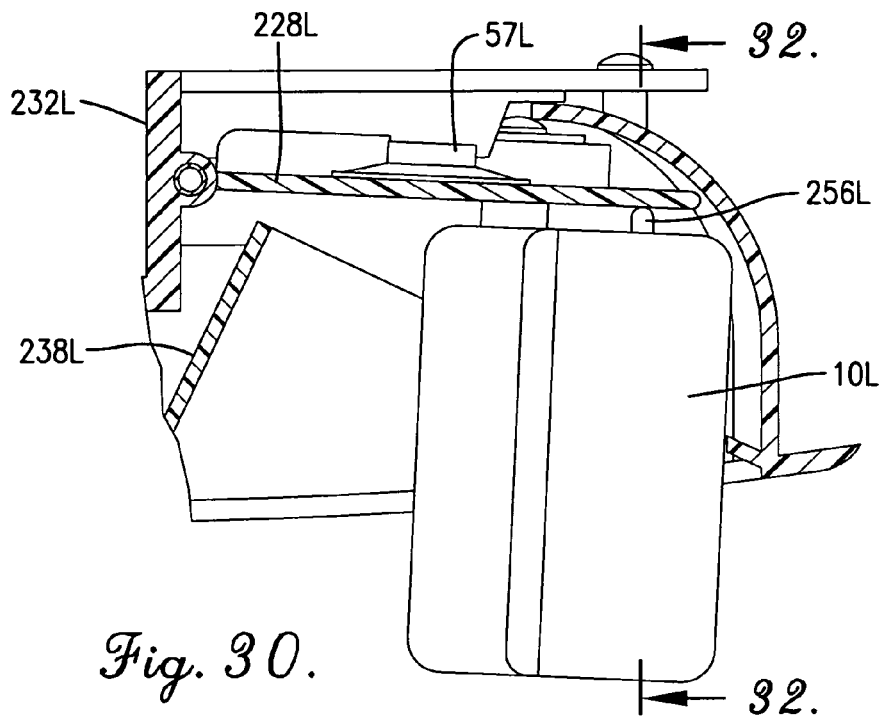
Figure 31:
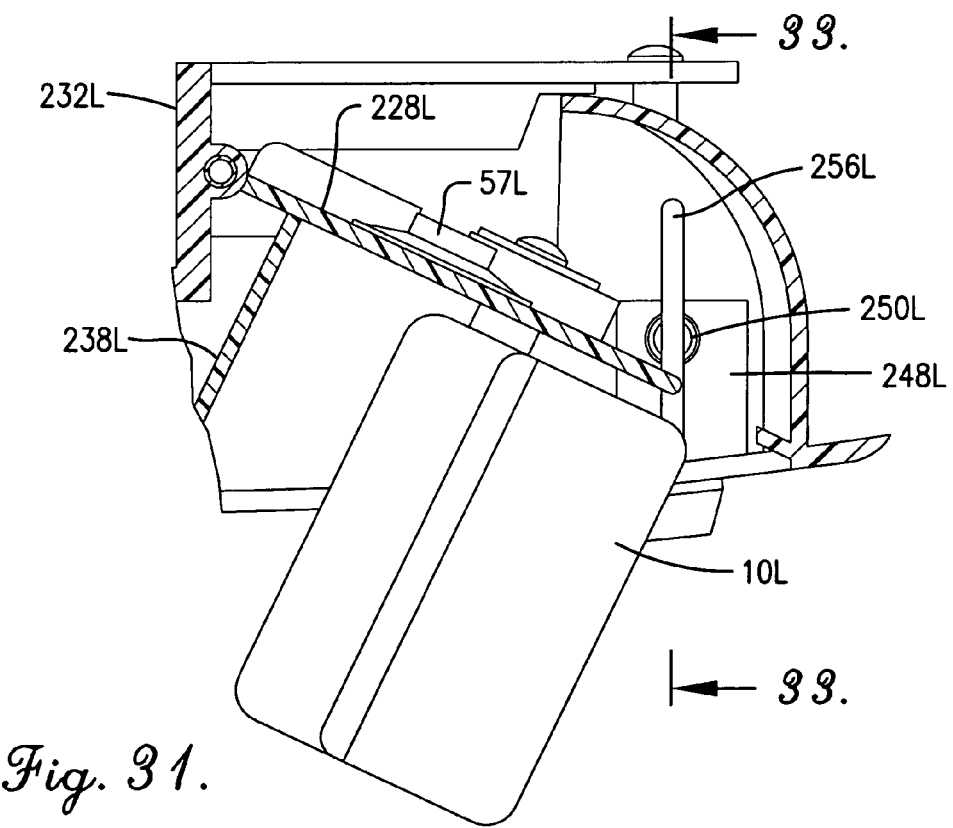
Figure 32:
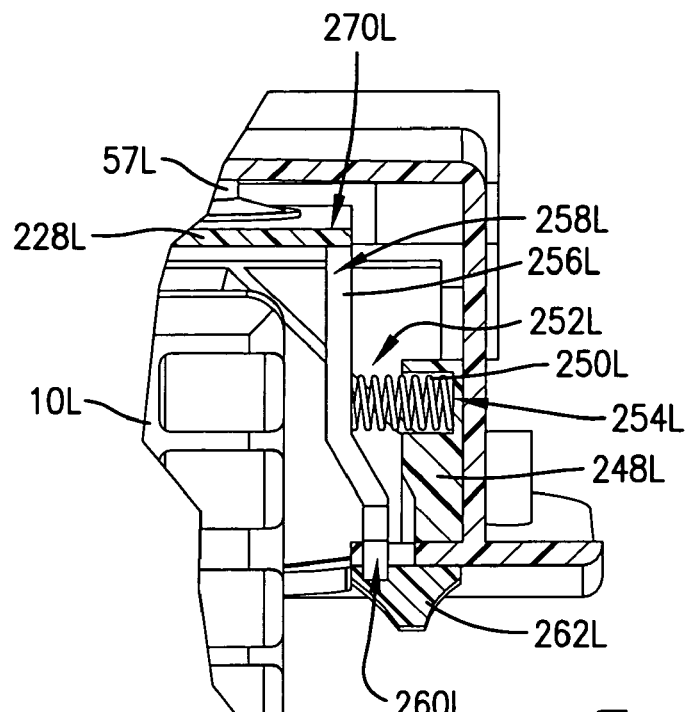
Figure 33:
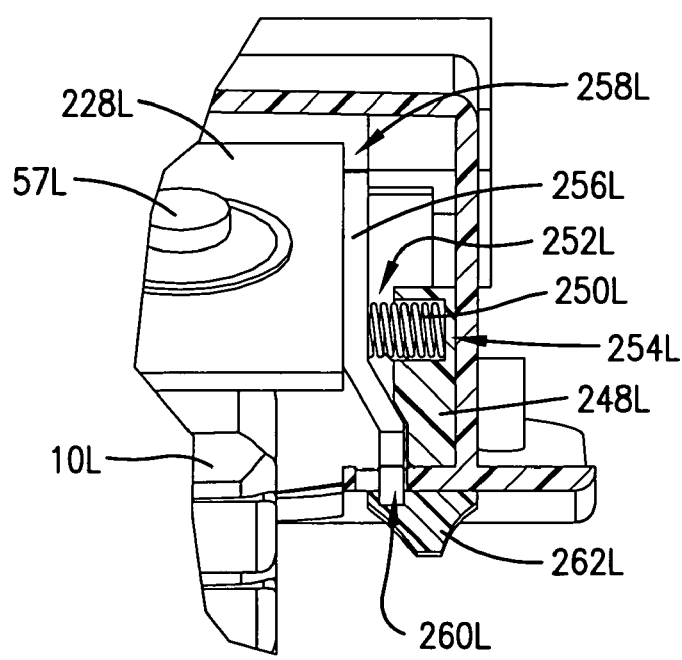

FIG. 18 is an exploded fragmentary isometric view of the navigational device of FIGS. 11 and 12, particularly illustrating a third mounting unit substantially similar to the second mounting unit of FIG. 15 but for the cradle, wherein the navigational device is adapted to be removably mounted on the dashboard of the vehicle via the cradle, such that the navigational device may be removably mounted within the open port illustrated in FIG. 11, the hollowed receptacle illustrated in FIG. 14, and on the dashboard of the vehicle;

FIG. 19 is a left side elevation view of the seventh preferred embodiment of the present invention illustrating a navigational device operable to pivot downwards into an optimal viewing position and to pivot upwards upon application of sufficient force;

FIG. 20 is a fragmentary isometric view of the navigational device of FIG. 19 releasably secured within an open port in an overhead console;

FIG. 21 is a fragmentary isometric view of the navigational device of FIG. 19 pivoted to the viewing position;

FIG. 22 is fragmentary isometric view of the navigational device of FIG. 19 illustrating a data storage bay for receiving a data cartridge;

FIG. 23 is a fragmentary isometric view of the eighth preferred embodiment of the present invention illustrating a fourth mounting unit sized and configured to fit within an open port and operable to rotate outwards, wherein the broken line illustrates the fourth mounting unit in a folded position and flush with a face of the open port;

FIG. 24 is a fragmentary isometric view of the mounting unit of FIG. 23 rotated outwards and operable to removably receive a navigational device;

FIG. 25 is a block diagram of the components of a navigational device constructed in accordance with a twelfth preferred embodiment of the present invention;

FIG. 26 is a fragmentary isometric view of an overhead console retrofitted with the navigational device of the twelfth preferred embodiment, particularly illustrating the navigational device in a raised position within an open port;

FIG. 27 is a fragmentary isometric view of the overhead console, particularly illustrating the navigational device in a lowered position;

FIG. 28 is a fragmentary isometric view of the navigational device of the twelfth preferred embodiment pivoted about a generally transverse axis within the open port;

FIG. 29 is an exploded isometric view of the mounting assembly of the twelfth preferred embodiment, particularly illustrating a mount, a support plate rotatably secured to the mount, the navigational device configured to be secured to the support plate, and the overhead console in which the mounting assembly is mounted;

FIG. 30 is a fragmentary cross-sectional side view of the navigational device of the twelfth preferred embodiment mounted within the open port and particularly illustrating the navigational device in the raised position;

FIG. 31 is a fragmentary cross-sectional side view of the navigational device of the twelfth preferred embodiment mounted within the open port and particularly illustrating the navigational device in the lowered position;

FIG. 32 is a fragmentary cross-sectional front view taken through the line 32—32 of FIG. 30 and particularly illustrating a positioning mechanism of the mount for positioning the navigational device in the raised position;

FIG. 33 is a fragmentary cross-sectional front view taken through the line 33—33 of FIG. 31 and particularly illustrating the placement of the positioning mechanism when the navigational device is in the lowered position; and FIG. 34 is a fragmentary isometric view of an overhead console particularly illustrating a navigational device of a thirteenth preferred embodiment in broken line in a fully stowed position within an open port.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, a navigational device 10 constructed in accordance with several preferred embodiments of the present invention is illustrated. The navigational device 10 is provided for insertion or mounting in an open port 12, an empty recess 14, or a hollowed receptacle 16 of a vehicle. The open port 12 results from removal of a non-navigational component 18 installed in the vehicle during manufacture or dealer preparation of the vehicle. The empty recess 14 was formed during manufacture of the vehicle and is designed to hold objects such as eyeglasses, compact discs, a compact disc player, a garage door opener, or other miscellaneous articles. The hollowed receptacle 16 is mounted within the vehicle, and the navigational device is mounted within the receptacle.

The navigational device 10 is thus uniquely suited for installation in a vehicle which does not originally contain nor is designed to receive a navigational device. Examples of vehicles in which the navigational device 10 may be installed include automobiles, motorcycles, boats, airplanes, and other transportation machines for moving persons or cargo.

As illustrated in FIG. 1, the navigational device 10 broadly comprises a navigation component 20; a processor 22 coupled with the navigation component 20; a memory 24 coupled with the processor 22; a display 26; an input 28; and a housing 30 for housing the navigation component 20, the processor 22, and the memory 24.

The navigation component 20 is preferably a global positioning satellite ("GPS") receiver, although other navigation components may be used. The preferred navigation component 20 is operable to receive satellite signals from a plurality of satellites using a GPS antenna 32, such as a GPS patch antenna 32, which is electronically coupled with the navigation component 20. The navigation component 20 is electronically coupled with the processor 22, and the processor 22 is operable to calculate a location of the navigational device 10 as a function of the satellite signals.

The memory 24 is preferably coupled with the processor 22 but may instead be coupled with a processor (not shown) of the vehicle. Cartographic data is preferably stored in the memory 24 and operable to be accessed by the processor 22 for viewing on the display 26 of the navigational device 10. The input 28 allows for control of the processor 22 using a plurality of control buttons 34, as illustrated in FIG. 2b. The control buttons 34 may be used to operate drop-down menus to select and input names or other identifiers. Alternatively, the input 28 may be an alphanumeric keypad (not shown), such as a telephone keypad, which may be used to type in names, identifiers, and text, or the input 28 may be a touch screen (not shown).

The housing 30 may be formed of plastic, fiberglass, or any other suitable material. Importantly, the housing 30 is sized and configured to mount within the open port 12, the empty recess 14, or the hollowed receptacle 16. Since the present invention may be used in a plurality of different types of vehicles, the open port 12, empty recess 14, and hollowed receptacle's 16 shape and size will be unique to the make and model of the vehicle. Thus, various navigational devices 10 of differing sizes and configuration are embodied in the present invention and will be described below.

Figure 3:
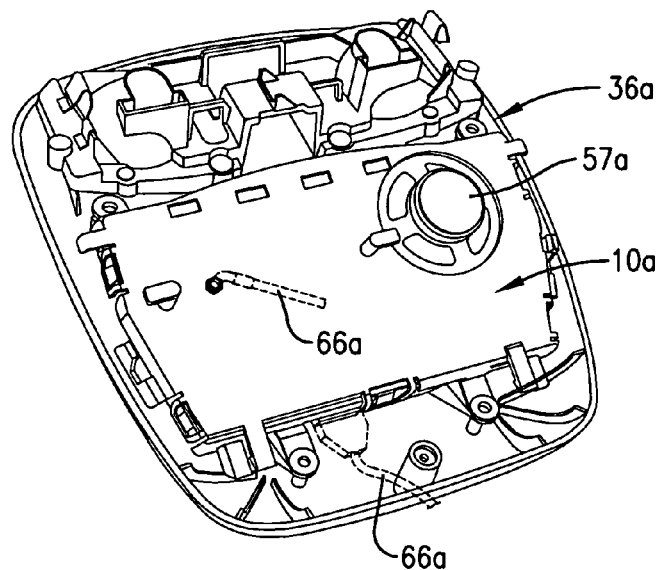
FIG. 3 is a rear isometric view of the overhead console of FIG. 1*a* illustrating the navigational device and the wires of the removed non-navigational component in broken line.

FIGS. 2a, 2b, 3, 4, and 5 illustrate a navigational device 10a constructed in accordance with a first preferred embodiment, which includes a housing 30a sized and configured to fit within an open port 12a resulting from removal of a non-navigational component 18a from an overhead console 36a of a vehicle. The non-navigational component 18a may be, for example, a light, an information display, an air vent unit, a clock, a compass, or a holder for holding eyeglasses, a garage door opener, or other miscellaneous articles. The housing 30a includes a front, frame-shaped section 38a and an attached rear, box-shaped section 40a. The front section 38a includes upper and lower walls 42a,44a and left and right side walls 46a,48a, which together define an enclosed area for receiving a display 26a. Control buttons 34a may be positioned on front faces 50a,52a of the left and right side walls 46a,48a, as depicted in FIG. 2a, or anywhere else on the housing 30a. The front face 50a of the left side wall 46a also preferably includes a series of longitudinal slots 54a which define a grill 56a, as illustrated in FIG. 2a, for use with a speaker 57a, as illustrated in FIG. 3, that may be coupled with a processor (not shown) for providing audible navigation instructions.

The rear, box-shaped section 40a is attached to a rear face 58a of the front section 38a and houses a navigation component (not shown), the processor (not shown), and a memory (not shown), although a processor (not shown) and a memory (not shown) of the vehicle may alternatively be connected to the navigational device 10a. The housing 30a of the navigational device 10a is preferably approximately six inches wide, four inches high, and five inches deep, although the width may range between two inches and twelve inches, the height may range between two inches and twelve inches, and the depth may range between two inches and twelve inches.

Figure 4:
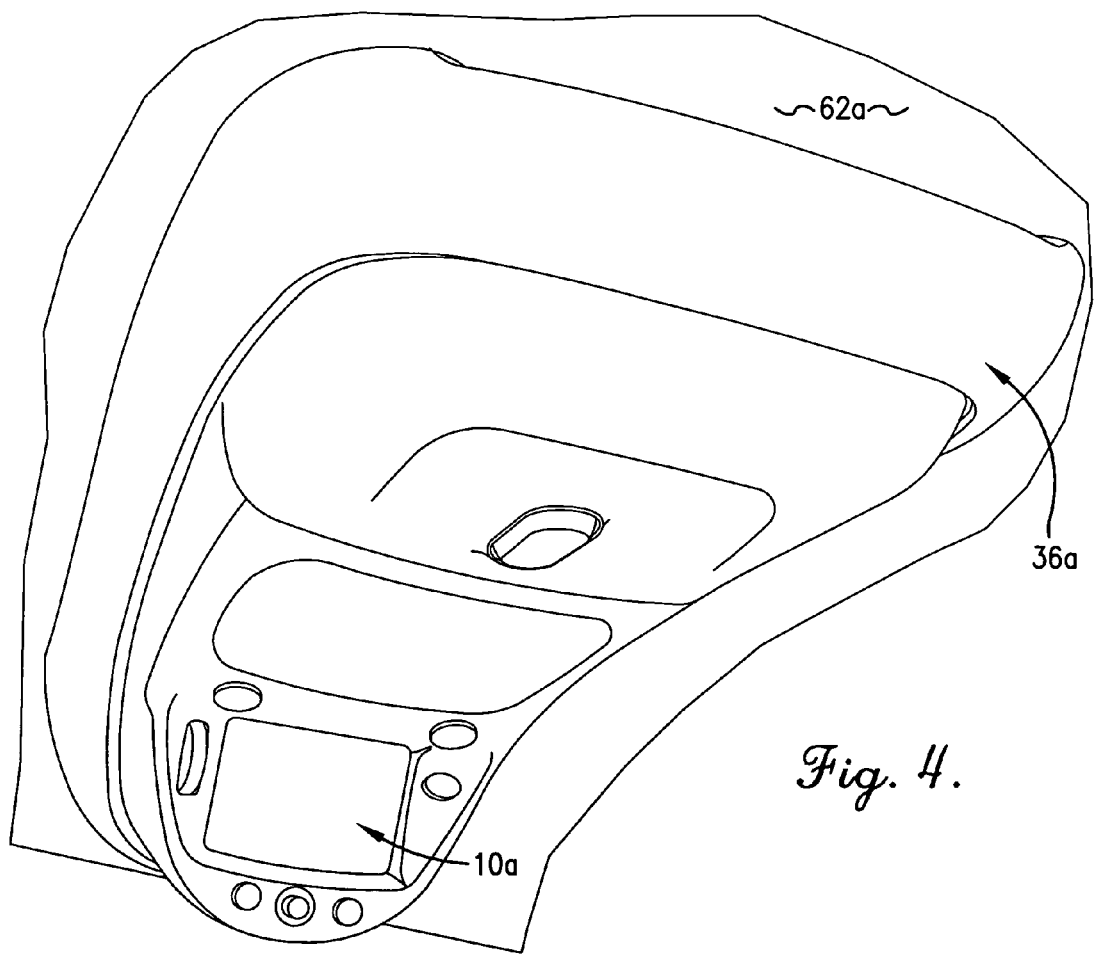
FIG. 4 is fragmentary isometric view of an alternative shape and size of the overhead console and the navigational device installed in the overhead console.
Figure 5:
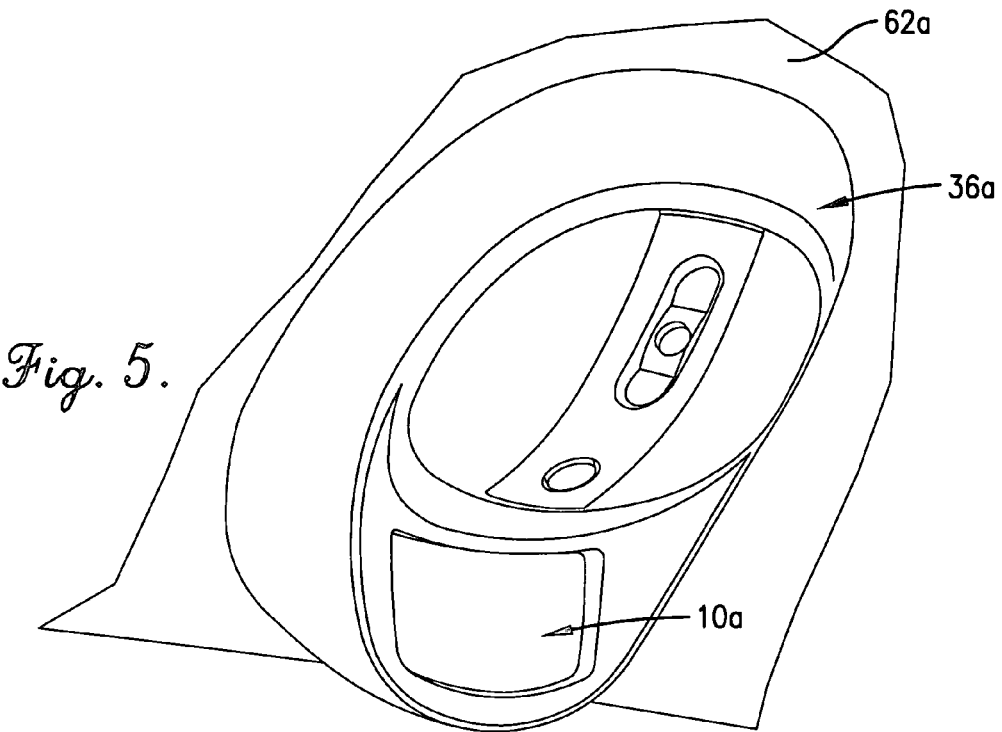
FIG. 5 is a fragmentary isometric view of a further alternative shape and size of the overhead console and the navigational device installed in the overhead console.

The overhead console 36a is any standard overhead console formed during manufacture of the vehicle, generally positioned on an interior roof section of the vehicle, and containing at least one non-navigation component 18a. The overhead console 36a generally comprises a main body 60a formed to fit with and be secured within an open area 62a of the vehicle, such as the interior roof section. The overhead console 36a is preferably within reach and within view of both a driver and a passenger of the vehicle. Additionally, the overhead console 36a is preferably positioned so as to not obstruct the driver's view in a rearview mirror. The overhead console's 36a shape and size will be unique to the make and model of each vehicle, as also illustrated in FIGS. 2a, 4, and 5.

To retrofit the vehicle with the first preferred embodiment of the present invention, the non-navigational component 18a is first removed from the overhead console 36a, as illustrated in FIG. 2a. Removal of the non-navigational component 18a results in the open port 12a. The navigational device 10a is then installed in the open port 12a of the overhead console 36a, as also illustrated in FIG. 2a. The navigational device 10a is importantly sized and configured to fit substantially within the open port 12a of the overhead console 36a. A front face of the navigational device 10a is preferably positioned generally flush with a face of the open port 12a, as also illustrated in FIGS. 4 and 5.

In an alternative of the first preferred embodiment, the overhead console 36a is entirely removed from the open area 62a, as illustrated in FIG. 2a, and a replacement overhead console 64a including the navigational device 10a is installed in the open area 62a, as illustrated in FIG. 2b. In this alternative, the overhead console 36a illustrated in FIG. 2a is formed during manufacture of the vehicle and does not originally include the navigational device 10a. The replacement overhead console 64a, as illustrated in FIG. 2b, may be substantially similar in shape and size, although not necessarily identical, to the overhead console 36a illustrated in FIG. 2a, but for differences necessary to accommodate the navigational device 10a. The replacement overhead console 64a, as illustrated in FIG. 2b, is then mounted within the open area 62a. The replacement overhead console 64a may include at least one non-navigational component 18a. Since the replacement overhead console 64a is formed after manufacture of the vehicle and includes the navigational device 10a, then the replacement overhead console 64a will necessarily not include at least one non-navigational component 18a that was included in the overhead console 36a. Alternatively, the non-navigational component 18a may be combined with the navigational device 10a, such that the replacement overhead console 64a includes all non-navigational components 18a that were included in the overhead console 36a, as discussed in more detail below. In a further alternative, two or more non-navigational components 18a from the overhead console 36a may be combined with regard to space such that the replacement overhead console 64a includes all non-navigational components 18a that were included in the overhead console 36a.

The navigational device 10a may also be connected to a power source (not shown) of the removed non-navigational component 18a. If the power source is supplied by the vehicle, then any wires 66a associated with the removed non-navigational component 18a, as illustrated in FIGS. 2a and 3, are connected to the newly installed navigational device 10a, as illustrated in FIG. 3. The navigational device 10a may include wires or other adapters 68a configured to connect with the existing wires 66a that were previously connected to the non-navigational component 18a. Alternatively, the navigational device 10a may include wires or other adapters 68a configured to connect directly with the power source supplied by the vehicle.

Further, the navigational device 10a may be connected to an information source (not shown) of the vehicle. For example, if the removed non-navigational component 18a was operable to display information about the vehicle, as illustrated in FIG. 2a, such as the outside temperature, the inside temperature of the vehicle, the vehicle's mileage, the vehicle's speed, the direction in which the vehicle is traveling, and the amount of mileage remaining based on the vehicle's power source, then the newly installed navigational device 10a may be connected to the information source of the non-navigational component 18a. The navigational device 10a is then operable to display the information formerly displayed by the non-navigational component 18a, in conjunction with displaying navigational information.

FIGS. 6–9 illustrate a navigational device 10b in accordance with a second preferred embodiment, which includes a housing 30b sized and configured to fit within an open port 12b resulting from removal of an air vent unit 70b from a vehicle. As with the first preferred embodiment, the size and shape of the open port 12b will be unique to the make and model of the vehicle, and thus, the second preferred embodiment provides for a plurality of shapes and sizes of navigational devices 10b.

Figure 6:
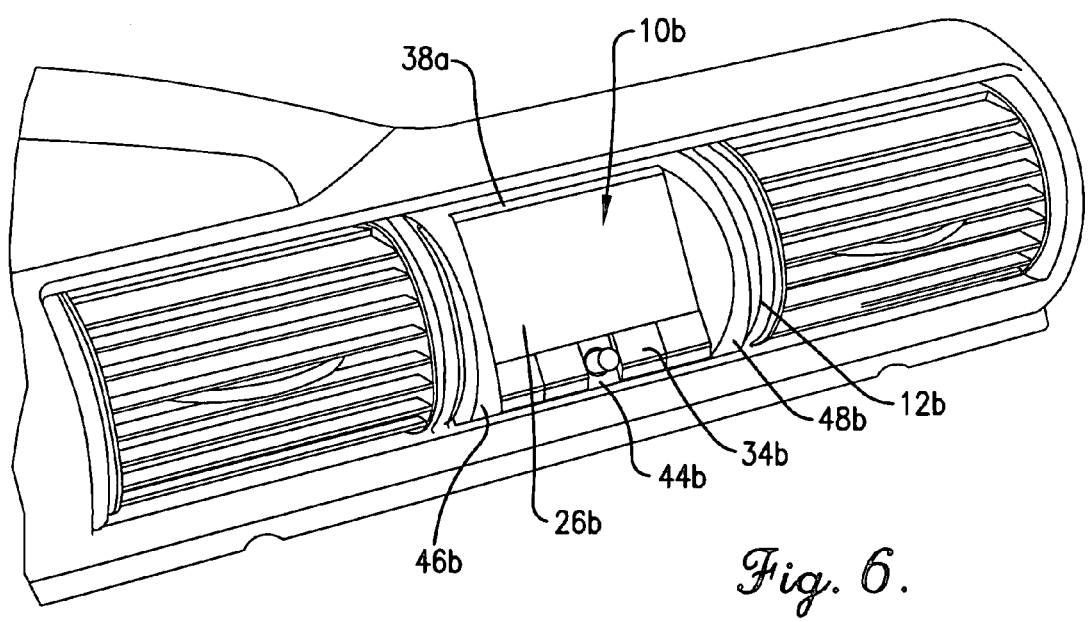
FIG. 6 is a fragmentary isometric view of the second preferred embodiment of the present invention illustrating a navigational device installed in an open port resulting from removal of a vehicle air vent unit.
Figure 7:
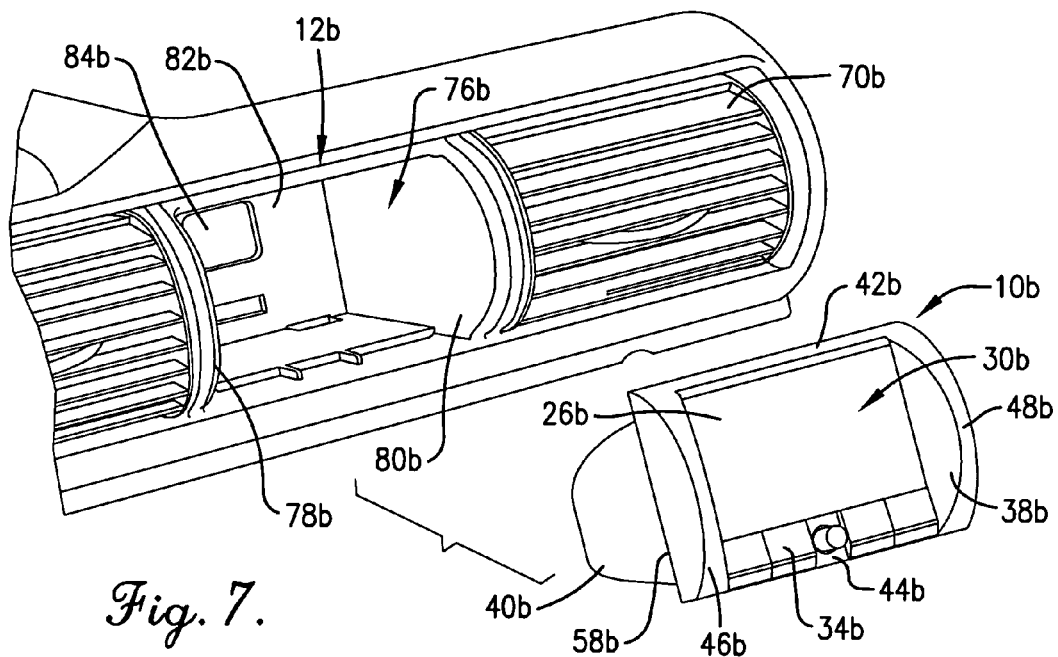
FIG. 7 is an exploded fragmentary isometric view of the navigational device and the open port of FIG. 6, particularly illustrating a first mounting unit for permanently mounting the navigational device in the open port.

As illustrated in FIGS. 6 and 7, the housing 30b is preferably approximately six inches wide, four inches high, and five inches deep, although the width may range between two inches and twelve inches, the height may range between two inches and twelve inches, and the depth may range between two inches and twelve inches. Similar to the first embodiment, the housing 30b includes a front, frame-shaped section 38b and an attached rear, box-shaped section 40b. The front section 38b includes upper and lower walls 42b,44b and left and right side walls 46b,48b which together define an enclosed area for receiving a display 26b. Control buttons 34b are positioned on the lower wall 44b. The left and right side walls 46b,48b are generally arcuate when viewed from a side and preferably project outwards from the display 26b so as to match the contours of the open port 12b.

The rear section 40b is attached to a rear face 58b of the front section 38b and houses a navigation component (not shown), a processor (not shown), and a memory (not shown). To facilitate the navigational device 10b fitting within the open port 12b, the rear section 40b of the housing 30b may be minimized. As illustrated in FIG. 7, the rear section 40b of the housing 30b tapers to a smaller size relative to an area of the front section 38b of the housing 30b, which allows the housing 30b to fit within relatively small open ports 12b.

Figure 8:
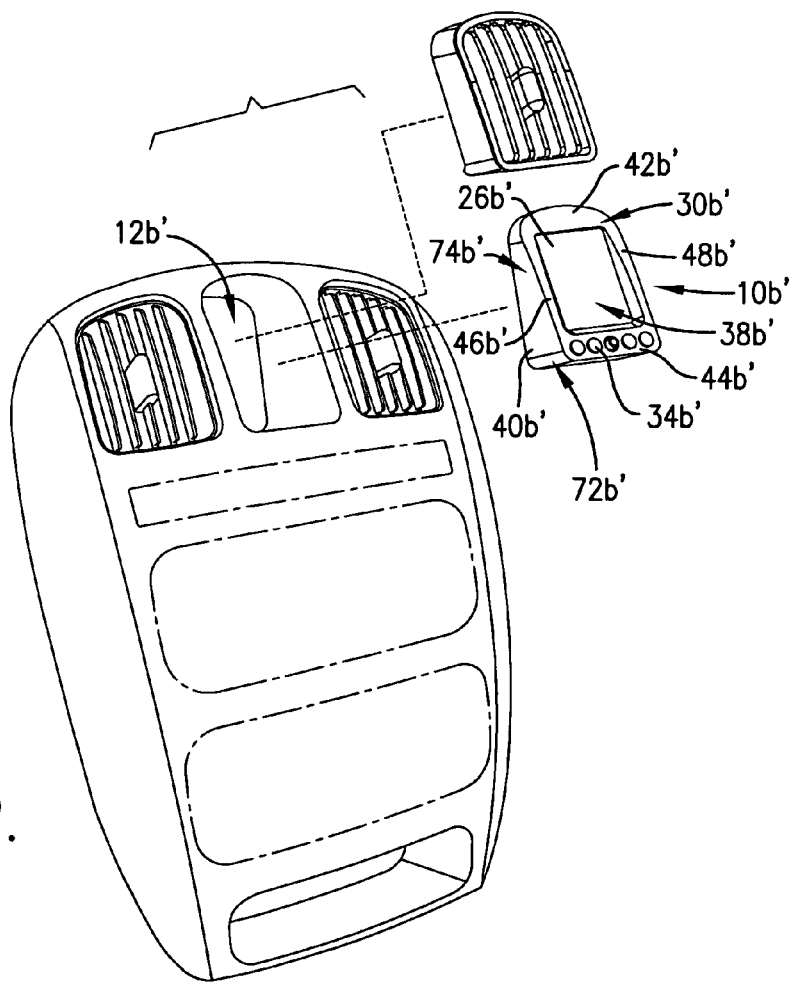
FIG. 8 is an exploded isometric view of the second preferred embodiment of the present invention, particularly illustrating removal of the air vent unit and insertion of the navigational device, wherein the navigational device is sized and configured to fit snugly within the open port.
Figure 9:
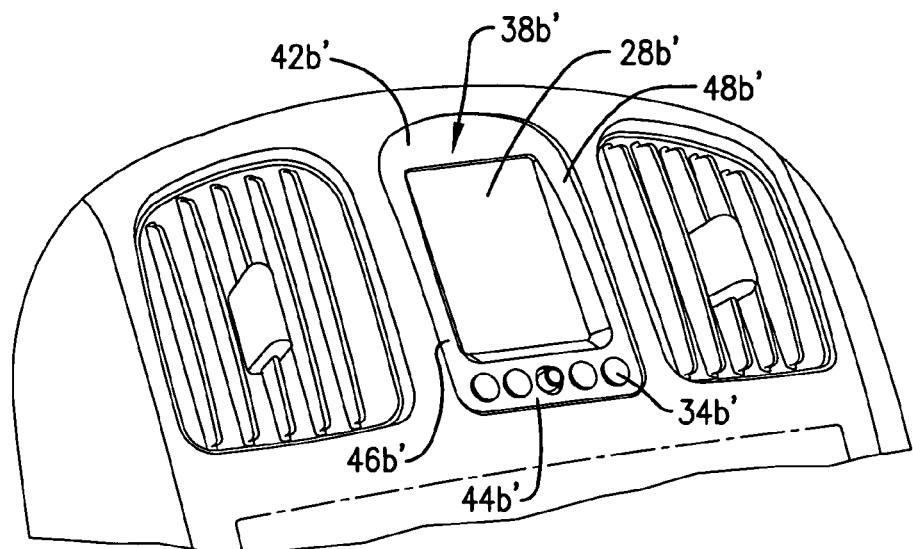
FIG. 9 is a fragmentary isometric view of the navigational device as illustrated in FIG. 8 inserted within the open port.

An alternative housing shape 30b' is illustrated in FIG. 8. As noted above, various open port 12b shapes and sizes necessitate various housing 30b shapes and sizes. As such, the housing 30b' illustrated in FIG. 8 preferably includes a front section 38b' and a rear section 40b'. The front section 38b' includes upper and lower walls 42b',44b'and left and right side walls 46b',48b', which together define an enclosed area for receiving a display 26b'. The upper wall 42b' is preferably arcuate so as to conform to the shape of an open port 12b'. Control buttons 34b'are preferably positioned on the lower wall 44b'. The rear section 40b' is preferably angled or sloped relative to the front section 38b' to better conform to the contours of the open port 12b' and to better position a navigational device 10b' at an optimal viewing angle. Additionally, the housing 30b' is preferably deeper at a lower end 72b' of the housing 30b' relative to an upper end 74b' of the housing 30b'. When positioned in the open port 12b', the front section 38b' of the housing 30b' is preferably flush with a face of the open port 12b', as illustrated in FIG. 9.

To install the navigational device 10b in the open port 12b, the second preferred embodiment provides for the navigational device 10b to fit within a first mounting unit 76b sized and configured to fit substantially within the open port 12b, as illustrated in FIGS. 6 and 7. The first mounting unit 76b is preferably adapted to permanently receive the navigational device 10b. The navigational device 10b is sized and configured to fit within the first mounting unit 76b and may be secured within the first mounting unit 76b using any conventional securing means, such as screws, brackets, adhesive, or other suitable methods. Alternatively, the navigational device 10b may be sized and configured to mount within the open port 12b resulting from removal of the air vent unit 70b without need for the first mounting unit 76b, as discussed in more detail below, and as illustrated in FIGS. 8 and 9.

The first mounting unit 76b is preferably box-shaped and includes left and right side walls 78b,80b and a rear wall 82b. The rear wall 82b is preferably provided with at least one opening 84b, as illustrated in FIG. 7. As with the first preferred embodiment, the navigational device 10b may include at least one wire or other adapter (not shown) mounted on the rear section 40b of the navigational device 10b for connecting the navigational device 10b to the power source (not shown) supplied by the vehicle. The wire on the navigational device 10b may then be inserted through the opening 84b in the rear wall 82b of the first mounting unit 76b.

The housing 30b of the navigational device 10b also preferably includes a first securing mechanism (not shown) for permanently securing the navigational device 10b within the first mounting unit 76b. The first securing mechanism may be any conventional securing means, such as screws, latches, brackets, or a combination of securing features.

The housing 30b also preferably includes insulation (not shown) for protecting the navigational device 10b and items housed within the navigational device 10b from excessive temperatures due to the vehicle's heating and cooling system. The insulation may be a housing of increased thickness (not shown) to act as a barrier against the excessive temperatures, actual insulation provided within the housing 30b, or other suitable protecting means.

Further, to avoid potential air noise problems that may result from removal of the air vent unit 70b, an air grate or vent (not shown) may be placed around the front section 38b of the housing 30b of the navigational device 10b. The grate serves to position the air flow so as to minimize noise resulting from removal of the air vent unit 70b. The air grate or vent may also cover any portion of the open port 12b the navigational device 10b does not fill to enhance the aesthetics of the installed navigational device 10b.

Figure 10:
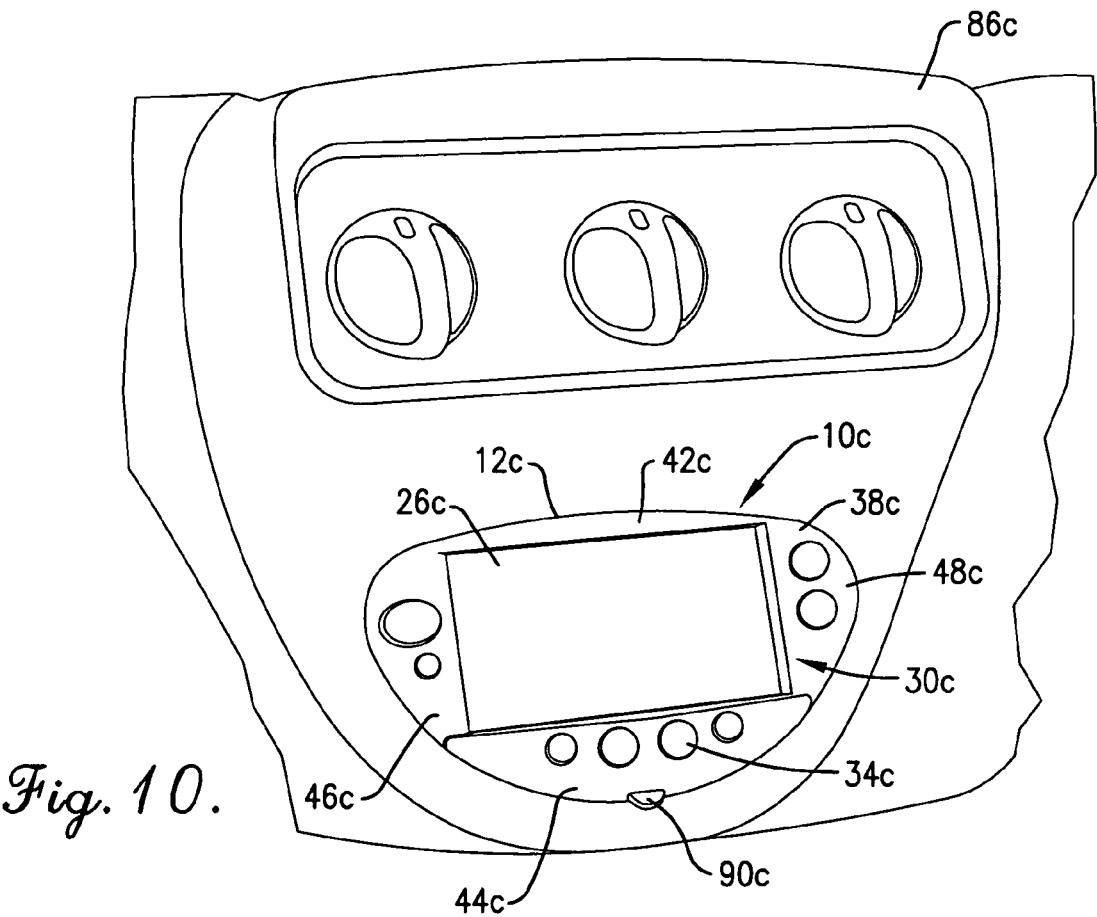
FIG. 10 is a fragmentary isometric view of the third preferred embodiment of the present invention particularly illustrating a navigational device mounted in a middle console of the vehicle.

In a third preferred embodiment, a navigational device 10c is sized and configured to fit within an open port 12c resulting from removal of a non-navigational component (not shown) in a middle console 86c of a vehicle, as illustrated in FIG. 10. The middle console 86c is preferably positioned directly under a dashboard (not shown) of the vehicle and generally center of the vehicle. In an alternative to the third preferred embodiment, the open port 12c may be positioned in the middle console 86c of the vehicle and result from removal of the air vent unit 70b, as illustrated in FIGS. 8 and 9.

Similar to previous embodiments, a housing 30c of the navigational device 10c is preferably approximately six inches wide, four inches high, and five inches deep, although the width may range between two inches and twelve inches, the height may range between two inches and twelve inches, and the depth may range between two inches and twelve inches. The housing 30c preferably includes a front section 38c and a rear section (not shown). The front section 38c is preferably curvilinear to conform to the contours of the open port 12c. The front section 38c includes upper and lower walls 42c,44c and left and right side walls 46c,48c, which together define an enclosed area for receiving a display 26c. Control buttons 34c are preferably positioned on the lower wall 44c and the left and right side walls 46c,48c. A grasping portion or tab 90c is preferably positioned on the lower wall 44c of the front section 38c, to remove the navigational device 10c from the open port 12c.

Once inserted in the open port 12c, the front section 38c of the housing 30c is preferably flush with a face of the open port 12c, as illustrated in FIG. 10. The rear section (not shown) is attached to a rear face (not shown) of the front section 38c and houses a navigation component (not shown), processor (not shown), and memory (not shown), although a processor (not shown) and a memory (not shown) of the vehicle may alternatively be connected to the navigational device 10c.

In a fourth preferred embodiment, a navigational device 10d is sized and configured to fit within an open port 12d resulting from removal of a non-navigational component (not shown) in a dashboard 88d of a vehicle, as illustrated in FIGS. 11 and 12. The dashboard 88d preferably extends a width of the vehicle, and the navigational device 10d may be installed at any location within the dashboard 88d, including to a left of a steering wheel (not shown) of the vehicle. In an alternative to the fourth preferred embodiment, the open port 12d may be positioned in the dashboard 88d of the vehicle and result from removal of an air vent unit (not shown).

Similar to previous embodiments, a housing 30d of the navigational device 10d is preferably approximately six inches wide, four inches high, and five inches deep, although the width may range between two inches and twelve inches, the height may range between two inches and twelve inches, and the depth may range between two inches and twelve inches. The housing 30d preferably includes a front section 38d and a rear section 40d. The front section 38d is generally rectangularly-shaped and includes upper and lower walls 42d,44d and left and right side walls 46d,48d, which together define an enclosed area for receiving a display 26d.

The rear section 40d is preferably attached to a rear face 58d of the front section 38d. Similar to the second preferred embodiment, the rear section 40d of the housing 30d is preferably minimized to facilitate mounting within the open port 12d. A navigation component (not shown), processor (not shown), and memory (not shown) are preferably stored in the rear section 40d. As illustrated in FIG. 11, the navigational device 10d is configured to removably mount within the open port 12d, as will be described below. Once mounted in the open port 12d, the front section 38d of the housing 30d preferably extends beyond a face of the open port 12d, as illustrated in FIG. 12. Additionally, an area of a vertical cross-section of the front section 38d may be larger than an area of the face of the open port 12d to prevent the navigational device 10d from sliding too far into the open port 12d, as also illustrated in FIG. 2.

In the first through fourth embodiments, a navigational device is sized and configured to mount within an open port resulting from removal of a non-navigational component. In a fifth preferred embodiment, a navigational device 10e is sized and configured to fit within an empty recess 14e formed during manufacture of a vehicle, as illustrated in FIG. 13 and as exemplarily illustrated in FIG. 16. The empty recess 14e may have been provided in the vehicle for holding objects such as eyeglasses, compact discs, a compact disc player, a garage door opener, or other miscellaneous articles. As illustrated in FIG. 13, the empty recess 14e may be located in a middle console 86e of the vehicle. Alternatively, the empty recess 14e may be located in an overhead console (not shown) or a dashboard (not shown) of the vehicle.

A housing 30e of the navigational device 10e is preferably approximately nine inches wide, four inches high, and six inches deep, although the width may range between two inches and sixteen inches, the height may range between two inches and twelve inches, and the depth may range between two inches and sixteen inches. The housing 30e preferably includes a front section 38e and a rear section 40e. As illustrated in FIG. 13, a display 26e is preferably located on a left side 94e of the front section 38e, and control buttons 34e are preferably located on a right side 96e of the front section 38e. The rear section 40e is preferably attached to a rear face 58e of the front section 38e. Depending on the location of the empty recess within the vehicle, the rear section 40e of the housing 30e need not be completely inserted in the empty recess 14e, as illustrated in FIG. 13. Instead, the navigational device 10e may be mounted within the empty recess 14e as necessitated by an optimal viewing angle.

In a sixth preferred embodiment, a navigational device 10f is sized and configured to fit within a hollowed receptacle 16f that is mounted in a vehicle. The hollowed receptacle 16f may, for example, be on a pillar 98f of a door frame of the vehicle, as illustrated in FIG. 14. The pillar 98f is preferably on a driver's side of the vehicle so that the navigational device 10f may be used by the driver of the vehicle. The pillar 98f, known in the art as an A-pillar, is the main supporting structure of the vehicle's door. The pillar 98f is preferably covered with rigid plastic or other suitable material that matches the color of an interior of the vehicle for aesthetic purposes.

A housing 30f of the navigational device 10f is preferably approximately four inches wide, four inches high, and eight inches deep, although the width may range between two inches and twelve inches, the height may range between two inches and twelve inches, and the depth may range between two inches and sixteen inches. The housing 30f is preferably oblong in shape and includes a front section 38f and a rear section (not shown). The front section 38f is preferably generally circularly-shaped. Similar to the previous embodiments, the rear section is secured to a rear face (not shown) of the front section 38f. A navigation component (not shown), processor (not shown), and memory (not shown) are preferably stored in the rear section.

To retrofit the pillar 98f with the navigational device 10f, the hollowed receptacle 16f is secured to the pillar 98f by conventional securing means, such as screws. The receptacle 16f is preferably generally oblong in shape to match the shape of the rear section (not shown) of the housing 30f. Other receptacle shapes may be used, such as spherical or cuboidal. The receptacle 16f has a face that is generally circular in shape, although the face may be differently shaped depending on the shape of the receptacle 16f and the housing 30f. The receptacle 16f is preferably positioned on the pillar 98f for easy viewing by a driver of the vehicle. The navigational device 10f is sized and configured to fit and mount within the hollowed receptacle 16f. Similar to previous embodiments, the navigational device 10f may be configured to connect to an information source (not shown) of the vehicle or a power source (not shown) supplied by the vehicle. Additionally, the navigational device 10f may be permanently or removably installed in the receptacle 16f, as discussed in more detail below.

Alternatively, as with the first embodiment, the pillar 98f may be removed and a replacement pillar (not shown) having the receptacle 16f and navigational device 10f secured thereto may be installed on the vehicle's door frame. The replacement pillar preferably has substantially the same shape, size, and color as the original pillar 98f, other than the inclusion of the receptacle 16f and navigational device 10f. In this alternative, the receptacle 16f is preferably integrally formed with the replacement pillar.

Figure 17:
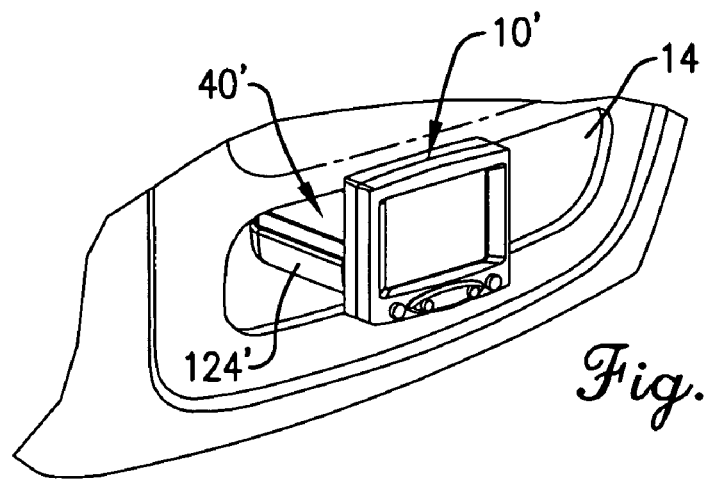
FIG. 17 is a fragmentary isometric view of the navigational device as illustrated in FIG. 16 removably mounted within the open port.

In all of the embodiments discussed above, the navigational device 10 may also be adapted to be removably mounted in the vehicle. As such, the navigational device 10 is configured to be removably mounted to a dashboard 88 of the vehicle, as illustrated in FIGS. 15 and 18, or within the open port 12, empty recess 14, or hollowed receptacle 16, as illustrated in FIGS. 16 and 17. Further, the navigational device 10 may be transferred between the dashboard 88 and the open port 12, empty recess 14, or hollowed receptacle 16. Further yet, the navigational device 10 may be removably mounted to a second vehicle, so that only one navigational device 10 need be used for multiple vehicles.

As illustrated in FIG. 15, the navigational device 10 is removably mounted to the dashboard 88 of the vehicle using a second mounting unit 100. The second mounting unit 100 includes a base 102 and a second securing mechanism 104. The base 102 is removably secured to the dashboard 88 of the vehicle using a vacuum lock 106. The base 102 is preferably generally circularly-shaped, and a circumference of the base 102 is partially surrounded by an overhanging flange 108. The base 102 is provided with a plurality of serrated teeth 110, the purpose of which will be described below.

The second securing mechanism 104 is secured to a rear section 40 of the housing 30 of the navigational device 10, as illustrated in FIG. 15, although the second securing mechanism 104 may be secured elsewhere on the housing 30. The second securing mechanism 104 is preferably circularly-shaped and includes first and second platforms 112,114. The navigational device 10 is preferably attached to the first platform 112, and the first platform 112 is preferably secured to the second platform 114. The first platform 112 is of a slightly smaller circumference than the second platform 114, such that the second platform 114 overhangs the first platform 112. This overhang leaves a rim 116 which can be guided into the overhanging flange 108 of the base 102 for securing the second securing mechanism 104 to the base 102, and thus, the navigational device 10 to the dashboard 88.

The second platform 114 is preferably provided with a plurality of serrated teeth 118 positioned around the second platform's 114 360° circumference. The serrated teeth 118 on the second platform 114 preferably have a pitch equivalent to a pitch of the serrated teeth 110 on the base 102. Once the rim 116 on the second platform 114 is guided into the overhanging flange 108, the serrated teeth 118 on the second platform 114 may be locked with the serrated teeth 110 on the base 102. The combined second securing mechanism 104 and navigational device 10 are then operable to rotate within the base 102 for moving the navigational device 10 to a plurality of desired viewing positions.

The navigational device 10 is preferably sized and configured to also mount or slide within the open port 12, empty recess 14, or hollowed receptacle 16 of the vehicle, as noted above with respect to the fourth preferred embodiment and the open port 12d. The navigational device 10 may also be mounted within the second vehicle in a substantially similar method as described above with respect to the original vehicle. For example, the navigational device 10 may be mounted on a dashboard of the second vehicle or in an open port, empty recess, or hollowed receptacle, wherein the dashboard and open port, empty recess, or hollowed receptacle of the second vehicle are substantially similar to the dashboard 88 and open port 12, empty recess 14, and hollowed receptacle 16 of the original vehicle.

An alternative third mounting unit 120' is illustrated in FIG. 18. The third mounting unit 120' is similar to the second mounting unit 100 in that includes a substantially similar base 102' and second securing mechanism 104'. Using the third mounting unit 120', a navigational device 10', substantially similar to the navigational device 10d of the fourth preferred embodiment, may be mounted to a dashboard 88' of the vehicle. Alternatively, the navigational device 10' may be removably mounted within the open port 12, empty recess 14, or hollowed receptacle 16 or transferred to and mounted within the second vehicle. In addition to the base 102' and second securing mechanism 104', the third mounting unit 120' also includes a pedestal 122' and a cradle 124', as illustrated in FIG. 18. When mounting the navigational device 10' on the dashboard 88' of the vehicle, the pedestal 122' is secured to a first platform 112' of the second securing mechanism 104', and the cradle 124' is secured to the pedestal 122'. The pedestal 122' raises the viewing height of the navigational device 10'. The pedestal 122' includes a turning lock 126' that is operable to tilt the navigational device 10' to a preferred viewing angle.

The cradle 124' is preferably generally U-shaped in cross section and has a width to accommodate a width of the navigational device 10'. As illustrated in FIG. 16, the cradle 124' preferably has a base wall 128' which is surrounded by a rear wall 130' and two side walls 132', all three of which are upstanding relative to the base wall 128'. The side walls 132' are each preferably provided with a flange 134', the purpose of which is described below. To secure the navigational device 10' within the cradle 124', the flanges 134' of the cradle 124' are inserted into a pair of recessed channels 136' provided on a rear section 40' of a housing 30' of the navigational device 10'. The rear wall 130' of the cradle 124' prevents the navigational device 10' from excessive sliding.

The cradle 124' may be mounted within any type of open port 12, empty recess 14, or hollowed receptacle 16 including the open port 12a formed from removal of the non-navigational component 30a in the overhead console 36a, the open port 12b formed from removal of the air vent unit 70b, the open port 12c formed from removal of the non-navigational component (not shown) in the middle console 86c, the open port 12d formed from removal of the non-navigational component (not shown) in the dashboard 88d, the empty recess 14e formed during manufacture of the vehicle and originally empty, or the hollowed receptacle 16f secured on the pillar 98f of the door frame. The cradle 124' may be secured within the open port 12, empty recess 14, or hollowed receptacle 16 by any conventional securing means, such as screws, adhesive, etc.

In a yet further alternative, the navigational device 10 may be sized and configured to be removably installed within the open port 12, empty recess 14, or hollowed receptacle 16 by simply inserting the navigational device 10 into the open port 12, empty recess 14, or hollowed receptacle 16 without need for any mounting unit 76b,100,120'. As exemplarily illustrated in FIGS. 8 and 9, the housing 30b of the navigational device 10b is dimensioned to fit snugly within the open port 12b. The housing 30b is large enough that the navigational device 10b will not fall through or slide too far into the open port 12b, yet the housing 30b is small enough that a user need not force or push the navigational device 10b into the open port 12b. As exemplarily illustrated in FIG. 10 and as noted above, the user may remove the navigational device 10c from the open port 12c by pulling the grasping portion or tab 90c on the front section 38c of the housing 30c.

Since the navigational device 10 may be removably mounted within the vehicle, it may not be convenient to connect the navigational device 10 to the power source (not shown) supplied by the vehicle and positioned within the overhead console 36a, middle console 86c, or dashboard 88d of the vehicle each time the navigational device 10 is mounted or installed in the vehicle. Therefore, the navigational device 10 may be provided with an internal power source (not shown), such as at least one battery, to provide power to the navigational device 10. Alternatively, the navigational device 10 may be connected to the power source supplied by the vehicle, wherein the power source is externally accessible on the middle console 86c or dashboard 88d of the vehicle.

In a seventh preferred embodiment illustrated in FIGS. 19–22, a navigational device 10g is sized and configured to fit within an open port 12g of an overhead console 36g. The open port 12g results from removal of a non-navigation component (not shown) substantially similar to the removed non-navigation component 18a of the first preferred embodiment, and the overhead console 36g is preferably substantially similar to the overhead console 36a of the first preferred embodiment. As such, the overhead console 36g is preferably positioned on an interior roof section of a vehicle. The navigational device 10g is preferably operable to pivot downwardly for optimal viewing, as illustrated in FIGS. 19–22. Preferably, an upper end 74g of a housing 30g of the navigational device 10g is pivotably or rotatably mounted within the open port 12g, as illustrated in FIGS. 19 and 21, using any conventional mounting mechanism (not shown), such as, for example, a pin in socket. The navigational device 10g is preferably releasably secured in a nested position in the open port 12g, as illustrated in FIG. 20, using any conventional securement mechanism (not shown), such as, for example, a detent and a spring-loaded release mechanism.

As with the previous embodiments, the housing 30g of the navigational device 10g is preferably approximately six inches wide, four inches high, and five inches deep, although the width may range between two inches and twelve inches, the height may range between two inches and twelve inches, and the depth may range between two inches and twelve inches. The housing 30g preferably includes a front section 38g and an attached rear section 40g, as illustrated in FIG. 21, and the housing 30g is sized and configured to fit substantially within the open port 12g. When in the nested position, the front section 38g of the housing 30g is preferably flush with a face of the open port 12g, as illustrated in FIG. 20. The rear section 40g of the housing 30g may be minimized to facilitate installation of the navigational device 10g in the open port 12g. The navigational device 10g is preferably sized and configured to fit within any overhead console or overhead console system, such as any overhead console manufactured by Johnson Controls of Milwaukee, Wis. As such, the navigational device 10g is preferably sized so that other items may also be secured or mounted within the overhead console 36g, such as eyeglasses, a garage door opener, or at least one light.

The front section 38g of the housing 30g includes upper and lower walls 42g,44g and left and right side walls 46g,48g, which together define an enclosed area for receiving a display 26g, as illustrated in FIG. 21. Control buttons 34g may be positioned on a front face 52g of the right side wall 48g or anywhere else on the housing 30g. A front face 50g of the left side wall 46g preferably includes a release button 138g that, when depressed, releases the spring-loaded release mechanism (not shown) or other securement mechanism (not shown), allowing the navigational device 10g to rotate downwardly, as illustrated in FIGS. 19 and 21. One or more speakers 57g may also be positioned proximate to the navigational device 10g, as illustrated in FIG. 20, and coupled with a processor (not shown) for providing audible navigation instructions. Further, the navigational device 10g may be connected to a power source and information source of the vehicle, or alternatively, the navigational device 10g may be provided with an internal power source (not shown) for powering the navigational device 10g.

Further, the navigational device 10g may be provided with a data storage bay 140g, as illustrated in FIG. 22, operable to receive a data or memory cartridge 142g for uploading cartographic data, such as maps. The data storage bay 140g is preferably accessible from a lower end 72g of the housing 30g of the navigational device 10g. Examples of data or memory cartridges 142g include a COMPACTFLASH memory data cartridge or a secured digital memory card. Preferably, the data storage bay 140g of the navigational device 10g is only accessible when the navigational device 10g is released from the nested position. Further, the data or memory cartridge 142g preferably fits entirely within the data storage bay 140g so that the navigational device 10g may be returned to the nested position, as discussed below, without interference from a protruding data cartridge.

The navigational device 10g preferably releasably locks into position once pivoted downwards into the optimal viewing position. The navigational device 10g locks into position using any conventional locking mechanism (not shown), such as, for example, a pin positioned in a series of notches or troughs. Preferably, the locking mechanism prevents the navigational device 10g from becoming unlocked from the optimal viewing position due to any vibrations from the vehicle, such as when the vehicle drives over a pothole. Thus, the navigational device 10g does not swing randomly but rather is stable and secure in the viewing position. The locking mechanism also preferably allows the navigational device 10g to be moved to a plurality of viewing positions and angles, which may be necessary depending on a height of a driver of the vehicle.

In accordance with an important aspect of the present invention, the navigational device 10g may be released from the locked position upon application of sufficient force, as depicted in FIG. 19. Such force may occur from a user applying sufficient pressure to release the locking mechanism (not shown) of the navigational device 10g. For example, using the pin positioned in the series of notches, sufficient force may occur when pressure is applied to the navigational device 10g so that the pin overcomes a hill or crest of the notch and fits within the next notch in the series. Thus, the navigational device 10g is operable to swing toward the open port 12g and return to the nested position. The navigational device 10g is operable to swing in this manner because the upper end 74g of the housing 30g is pivotably secured to an upper end 168g of the open port 12g. This is especially important since it allows the navigational device 10g to swing towards the open port 12g in the event of a head or body impact, thereby adding a safety feature. Alternatively, the navigational device 10g may be returned to the nested position by depressing and holding in the release button 138g and guiding the navigational device 10g back into the nested position.

An additional feature of the navigational device 10g is that a range of rotation of the navigational device is minimized. This limits the amount that any wires (not shown), such as wires connecting the navigational device 10g to a power source, information source, or other feature supplied by the vehicle, are bent during pivoting of the navigational device 10g to the optimal viewing position. Thus, any damage to the wires is minimized.

In an eighth preferred embodiment, a navigational device 10h is sized and configured to removably fit within a fourth mounting unit 144h, wherein the fourth mounting unit 144h is sized and configured to fit substantially within an open port 12h of an overhead console 36h, as illustrated in FIGS. 23 and 24. The open port 12h results from removal of a non-navigation component (not shown) substantially similar to the removed non-navigation component 18a of the first preferred embodiment, and the overhead console 36h is preferably substantially similar to the overhead console 36a of the first preferred embodiment. As such, the overhead console 36h is preferably positioned on an interior roof section of a vehicle. The fourth mounting unit 144h is operable to rotate outwards and away from the open port 12h so that the navigational device 10h may be positioned in an optimal viewing position, as illustrated in FIG. 24 and as discussed below. The navigational device 10h is sized and configured to fit within any overhead console or overhead console system, such as any overhead console manufactured by Johnson Controls of Milwaukee, Wis. As such, the navigational device 10h is preferably sized so that other items may also be secured or mounted within the overhead console 36h, such as eyeglasses, a garage door opener, or at least one light.

Similar to previous embodiments, a housing 30h of the navigational device 10h is preferably approximately six inches wide, four inches high, and five inches deep, although the width may range between two inches and twelve inches, the height may range between two inches and twelve inches, and the depth may range between two inches and twelve inches. The housing 10h preferably includes a front section 38h and an attached rear section 40h, as illustrated in FIG. 24. The front section 38h includes upper and lower walls 42h,44h and left and right side walls 46h,48h, which together define an enclosed area for receiving a display 26h. The rear section 40h of the housing 30h may be minimized to facilitate installation of the navigational device 10g in the open port 12g. Control buttons 34h may be positioned on a front face 52h of the right side wall 48h or anywhere else on the housing 30h. One or more speakers 57h may also be positioned proximate to the navigational device 10h, as illustrated in FIG. 23, and coupled with a processor (not shown) for providing audible navigation instructions.

The fourth mounting unit 144h preferably includes upper and lower walls 146h,148h formed at upper and lower ends 150h,152h, respectively, of the fourth mounting unit 144h. Additionally, the fourth mounting unit 144h includes left and right side walls 154h,156h. Together, the upper and lower walls 146h,148h and the left and right side walls 154h,156h define an open area for receiving the navigational device 10h. Mounting unit control buttons 158h are preferably positioned on front faces 160h,162h of the upper and lower walls 146h, 148h. Specifically, an eject button 164h for removing the navigational device 10h is positioned on the front face 160h of the upper wall 146h, as described in more detail below. The mounting unit control buttons 158h may operate a variety of features, such as, for example, controlling a brightness of the display 26h of the navigational device 10h or controlling a volume of the audible navigation instructions. Further, the mounting unit control buttons 158h may operate non-navigation features, such as, for example, operating a garage door opener. The above example features are not intended to be limiting or exhaustive, and thus, additional features to which the navigational device 10h may be connected are within the scope of the present invention.

The fourth mounting unit 144h is preferably secured within the open port 12h using any conventional securing mechanism (not shown) and is operable to fold or nest entirely within the open port 12h. When the fourth mounting unit 144h is folded within the open port 12h, a rear face 166h of the fourth mounting unit 144h faces outwards and fits generally flush with a face of the open port 12h, as illustrated in FIG. 23. Thus, the rear face 166h is preferably exposed to a user viewing the overhead console 36h when the fourth mounting unit 144h is in a folded or nested position. The rear face 166h of the fourth mounting unit 144h preferably generally matches a color of the overhead console 36h for aesthetic purposes. When folded within the open port 12h, the lower end 152h of the fourth mounting unit 144h is positioned at an upper end 168h of the open port 12h, and conversely, the upper end 150h of the fourth mounting unit 144h is positioned at a lower end 170h of the open port 12h. Therefore, when the fourth mounting unit 144h is unfolded from its nested position within the open port 12h, the lower end 152h of the fourth mounting unit 144h rotates downwards, as illustrated in FIG. 23. A user may rotate the fourth mounting unit 144h downwards by pulling a release handle 172h secured to the rear face 166h of the fourth mounting unit 144h.

The fourth mounting unit 144h is also preferably provided with at least one first connector 174h for connecting the navigational device 10h to a power source supplied by the vehicle, the speakers 57h, an antenna supplied by the vehicle, or an information source supplied by the vehicle. Alternatively, the first connector 174h may be a multi-purpose connector that connects the navigational device 10h to two or more of the above features.

A rear face 176h of the rear section 40h of the navigational device 10h is preferably provided with at least one second connector (not shown) operable to mate with the respective first connector 174h. As noted above, the housing 30h of the navigational device 10h is sized and configured to fit substantially within the open area of the fourth mounting unit 144h. As such, the second connector on the navigational device 10h preferably easily mates with the first connector 174h on the fourth mounting unit 144h. Although the navigational device 10h may be connected to features supplied by the vehicle, such as power, the navigational device 10h may alternatively include an internal power source, one or more speakers 57h, an antenna, an information source, or any other features desired for use of the navigational device 10h in the vehicle.

The navigational device 10h may be secured within the open area of the fourth mounting unit 144h either via the mating of the first connector 174h and the second connector (not shown) or using any conventional latching or securing mechanism (not shown), such as, for example, notches provided on the navigational device 10h adapted to releasably secure with hinged, spring-loaded detents provided on the fourth mounting unit 144h. Insertion of the navigational device 10h in the fourth mounting unit 144h depresses the detents, and removal of the navigational device 10h releases the springs to release the detents, and thus, the navigational device 10h from the fourth mounting unit 144h. The detents may be released by depressing the eject button 164h. Alternative latching or securing mechanisms are within the purview of the present invention, and the above securing mechanism is provided for example only.

In accordance with an important aspect of the present invention, the navigational device 10h may be secured within the open area of the fourth mounting unit 144h, as described above, and the fourth mounting unit 144h, including the navigational device 10h, may be folded into the open port 12h, thus securing the navigational device 10h within the open port 12h and out of view. This securement within the open port 12h also provides security from potential intruders who may wish to steal the navigational device 10h. Because a potential intruder cannot see the navigational device 10h, the intruder is less likely to break into the vehicle.

Ninth and tenth preferred embodiments are disclosed in U.S. application Ser. No. 10/663,044, filed Sep. 13, 2003, which is also incorporated herein by reference. An eleventh preferred embodiment is disclosed in U.S. application Ser. No. 10/663,045, filed Sep. 13, 2003, and further incorporated herein by reference.

In a twelfth preferred embodiment of the present invention, illustrated in FIGS. 25–34, a navigation assembly 5l comprises a navigational device 10l and a mounting assembly 218l for fixedly or removably attaching the navigational device 10l in an open port 12l of an overhead console 36. The twelfth preferred embodiment is similar to the first preferred embodiment in that the open port 12l results from removal of a non-navigational component (not shown), such as a sunglasses holder, installed in the vehicle during manufacture or dealer preparation of the vehicle. Unlike the first preferred embodiment, however, the twelfth preferred embodiment provides the mounting assembly 218l that is configured to linearly position the navigational device 10I in a plurality of viewing positions, as discussed in more detail below. Further, because the navigational device 10l is fixedly or removably attached to the mounting assembly 218l and not directly mounted within the open port 12l, the navigational device 10l need not be sized and configured to fit the exact dimensions of the open port 12l.

Similar to the first preferred embodiment, the navigational device 10l is preferably a conventionally sized navigational device, such as the GARMIN 2650 or GARMIN 2610 manufactured by Garmin International, Inc. The navigational device 10l includes a navigation component 20l; a processor 22l coupled with the navigation component 20l; a memory 24l coupled with the processor 22l; a display 26l; an input 28l; an antenna 32l, such as a patch antenna; at least one speaker 57l; a temperature sensor 220l electronically coupled with the processor 22l; and a housing 30l for housing the navigation component 20l, the processor 22l, the memory 22l, and the display 26l, as best illustrated in FIGS. 25 and 26. The navigation component 20l, processor 22l, memory 24l, display 26l, input 28l, antenna 32l, and speaker 57l are all preferably substantially similar to the corresponding elements of the first preferred embodiment. As discussed briefly with respect to the first preferred embodiment, the patch antenna 32l of the twelfth preferred embodiment is preferably adapted for placement on the windshield of the vehicle and is electronically connected to the navigational device 10l via at least one connecting wire 222l, as illustrated in FIG. 26.

The navigational device 10l may also include a dead reckoning system (not shown) that accounts for the vehicle's speed and turns to determine a route the vehicle has traveled. The dead reckoning system may then be used if the navigation component 20*l* is inoperable or otherwise inaccessible. Such a dead reckoning system may require that the navigational device 10*l* be electrically connected with a speedometer of the vehicle and with turn sensors on the wheels of the vehicle.

The temperature sensor 220*l* is preferably operable to determine an outside or inside temperature, which may then be displayed on a lower portion 224*l* of the display 26*l*, as illustrated in FIG. 26. Alternatively, the processor 22*l* of the navigational device 10*l* may be electronically coupled with a temperature sensor (not shown) of the vehicle, such that the outside or the inside temperature determined by the temperature sensor of the vehicle is displayed on the display 26*l*.

The navigational device 10*l* may also be coupled with a power source (not shown) of the vehicle, or alternatively, the navigational device 10*l* may include an internal power source (not shown). Preferably, the navigational device 10*l* is coupled with a power source that powers a light source also housed within the overhead console 36*l*.

The mounting assembly 218*l* of the twelfth preferred embodiment is preferably sized and configured to mount within the open port 12*l* of the vehicle. The mounting assembly 218*l* includes a mount 226*l* configured to be secured within the open port 12*l* and a support plate 228*l* rotatably secured to the mount 226*l* and extending therefrom. The navigational device 10*l* is then pivotably secured to the plate 228*l*, such that the navigational device 10*l* extends generally transverse therefrom, as best illustrated in FIG. 29. The mounting assembly 218*l* is then mounted within the open port 12*l* of the overhead console 36*l* via at least one screw 230*l* or other securing mechanism. An underside of the overhead console 36*l* is illustrated in FIG. 29, and the location of the mounting assembly 218*l* within the overhead console 36*l* is referenced as letter A.

The mount 226*l* includes an upper back wall 232*l*, left and right side walls 234*l*,236*l*, an angled lower back wall 238*l*, and left and right extending top walls 240*l*,242*l*. The upper back wall 232*l* is integrally formed or otherwise secured to the left and right side walls 234*l*,236*l*. The angled lower back wall 238*l* is also integrally formed or otherwise secured to the left and right side walls 234,236*l* via a pair of generally triangularly shaped securing walls 244*l*. The left and right top walls 240*l*,242*l* are integrally formed with the upper back wall 232*l* and extend substantially perpendicular therefrom. The right side wall 236*l* is coupled with a positioning or locking mechanism 246*l* for linearly positioning the navigational device 10*l* in the plurality of vertical positions within the open port 12*l*.

The positioning mechanism 246*l* includes a mounting plate 248*l*, a spring 250*l* having proximal and distal ends 252*l*,254*l*, an angled stem 256*l* having proximal and distal ends 258*l*, 260*l*, and a release switch 262*l*. The mounting plate 248 is secured to or integrally formed with the right side wall 236*l* and extends therefrom. The distal end 254*l* of the spring 250*l* is secured to the plate 248*l*, such that the spring 250*l* extends longitudinally towards the left side wall 234*l*. The stem 256*l* is secured to the proximal end 252*l* of the spring 250*l*, such that a length of the stem 256*l* is generally transverse to the longitudinal orientation of the spring 250*l*. The release switch 262*l* includes an opening 264*l* through which the distal end 260*l* of the stem 256*l* is secured, thus coupling the release switch 262*l* to the stem 256*l*. The release switch 262*l* is configured to be pressed with a user's thumb or finger.

As noted above, the support plate 228*l* is rotatably secured to the mount 226*l* and specifically to the upper back wall 232*l*, as illustrated in FIG. 29. The plate 228l includes at least one speaker grill 266*l* on which is mounted the at least one speaker 57*l*. The speaker 57*l* is electronically coupled with the navigational device 10*l* to provide audible navigation instructions, including turn-by-turn instructions. Alternatively, the speaker 57*l* may be electronically coupled with an existing audio system (not shown) of the vehicle.

As also noted above, the navigational device 10*l* is pivotably secured to the support plate 228*l* via a pivot screw 268*l* or other fastener, such that the navigational device 10*l* extends generally transverse from the plate 228*l*. The extension of the navigational device 10*l* from the plate 228*l* is along a transverse axis, illustrated in FIG. 29 in broken line at letter "B." The navigational device 10*l* is operable to rotate or pivot about the transverse axis in both a left and a right direction relative to the open port 12*l*, as illustrated in FIG. 28, thus allowing the user to position the navigational device 10*l* to a better viewing angle. Such a pivoting feature may be desired if the user is sitting in the passenger's seat of the vehicle, or if the navigational device 10*l* needs to be repositioned due to sun glare or to adjust for a height of the user.

Once mounted to the plate 228*l*, the navigational device 10*l* is positioned relatively stable to the mount 226*l*. Due to the support plate 228*l* being rotatably secured to the mount 226*l*, the navigational device 10*l* is operable to be raised or lowered in a generally linear direction within the open port 12*l*, as illustrated in FIGS. 30–33. Due to the positioning mechanism 246*l*, the navigational device 10*l* is operable to be removably positioned in one or more viewing positions that are in a general linear relationship to each other, as described below.

As illustrated in FIGS. 26, 30, and 32, the mounting assembly 218*l* is operable to generally linearly position the navigational device 10*l* in at least two viewing positions. In particular, when the support plate 228*l* is generally perpendicular to the upper back wall 232*l* of the mount 226*l*, the navigational device 10*l* is in a raised position, such that approximately one-thirds of the display 26*l* is viewable by the user. The amount of viewable display when the navigational device 10*l* is in the raised position may range from approximately one-sixths of the display 26*l* to approximately five-sixths of the display 26*l*, depending on the size of the navigational device 10*l*. When in the raised position, approximately two-thirds of the navigational device 10*l* is stowed within the open port 12*l* (and approximately one-thirds of the navigational device 10*l* is outside the open port 12*l*), depending on the size of the navigational device 10*l*. For example, if the navigational device 10*l* is relatively small, approximately three-fourths of the navigational device 10*l* may be stowed within the open port 12*l* when in the raised position. In contrast, if the navigational device 10*l* is relatively large, approximately one-thirds of the navigational device 10*l* may be stowed within the open port 12*l*. Therefore, when the plate 228*l* is generally perpendicular to the upper back wall 232*l*, approximately one-thirds to three-fourths of the navigational device 10*l* is stowed within the open port 12*l*. When the navigational device 10*l* is in the raised position, only the lower portion 224*l* of the display 26*l* can be viewed by the user, as described above and in more detail below.

Further, at least a portion of the navigational device 10*l* will be positioned outside the open port 12*l*, even in the raised position, such that the mounting assembly 218*l* is not sized and configured to stow the entire navigational device 10*l*. Additionally, unlike the prior preferred embodiments, the navigational device 10*l* does not pivot into the open port 12*l*, but rather, the mounting assembly 218*l* is operable to raise or lower the navigational device 10*l* generally linearly within the open port 12*l*, as described below. Therefore, the viewing positions of the navigational device 10*l* are in a general linear relationship to each other.

As illustrated in FIGS. 27, 32, and 33, when the support plate 228*l* is angled downwards, such that an angle between the upper back wall 232*l* and the plate 228*l* is generally less than 90° and the navigational device 10*l* is in a lowered position, approximately one-thirds of the navigational device 10*l* is stowed within the open port 12*l*. As noted above with respect to the raised position, the portion of the navigational device 10*l* stowed within the open port 12*l* may range from approximately none of the navigational device 10*l* to approximately one-half of the navigational device 10*l*, depending on the size of the navigational device 10*l*. When in the lowered position, substantially all of the display 26*l* can be viewed by the user, as illustrated in FIG. 27.

As best illustrated in FIGS. 30–33, a right edge 270*l* of the support plate 228I rides against and along the stem 256*l* when the navigational device 10*l* is raised and lowered. As such, the navigational device 10*l* raises or lowers along a generally vertical axis of the stem 256*l*. When the navigational device 10*l* is in the lowered position, the spring 250*l* is compressed, and the stem 256*l* is positioned in its rightmost orientation. To raise the navigational device 10*l* into its raised position, the user need only gently press a general lower region of the navigational device 10*l* upwards. Upward movement of the navigational device 10*l* from the lowered position will force the right edge 270*l* of the support plate 228*l* to ride against and along the stem 256*l*. Because the plate 228I is positioned above the proximal end 258*l* of the stem 256I, when the plate 228*l* is generally perpendicular to the upper back wall 232*l* of the mount 226*l*, the plate 228*l* clears the length of the stem 256*l*, thus allowing the spring 250*l* to extend and move the stem 256*l* to its leftmost position, as illustrated in FIG. 32. The proximal end 256*l* of the stem 256*l* is then positioned under the right edge 270*l* of the plate 228I. To then lower the navigational device 10*l* back into its lowered position, the user must actuate the release switch 262*l* to the right, which then moves the stem 256*l* back to its rightmost position and compresses the spring 250*l*, allowing the plate 228*l* to rotate downwards, as illustrated in FIG. 33.

A method of installing the navigation assembly 5*l* is substantially similar to the method described in the first preferred embodiment and includes the steps of removing the non-navigational component (not shown) from the overhead console 36*l*, which results in the open port 12*l*; installing the mounting assembly 218*l* in the open port 12*l*; and fixedly or removably attaching the navigational device 10*l* to the mounting assembly 218*l*.

The navigation assembly 5*l* of the twelfth preferred embodiment provides several advantageous features. First, the navigational device 10*l* is sized such that even in the lowered position, the navigational device 10*l* does not obstruct viewing in the rearview mirror, as illustrated in FIG. 27. Second, unlike prior embodiments, the navigational device 10*l* does not pivot within the open port 12*l* but rather is linearly positioned within the open port 12*l*, such that the navigational device 10*l* may be moved to the plurality of generally linear viewing positions. This permits the navigational device 10*l* to be positioned in more than one viewing position. Although only the raised and lowered positions are described above, the mounting assembly 218*l* may be configured to permit the navigational device 10*l* to be positioned in more than two linear viewing positions.

Third, in the raised position, displayed information can still be seen on the display 26*l*, as illustrated in FIG. 26. Such information may include, for example, the outside temperature, the inside temperature, a bearing, a current location, a stored route, a next cross street, and/or a next turn.

It is also noted that in both the raised and lowered positions, the navigational device 10*l* is operable to pivot left and right to a preferred viewing angle.

Further, although the navigational device 10*l* is not intended to be removed from the vehicle once initially installed, the mounting assembly 218*l* described above allows the navigational device 10*l* to be removed quickly and without damaging the mounting assembly 218*l* or the overhead console 36*l*.

A thirteenth preferred embodiment, illustrated in FIG. 34, is substantially similar to the twelfth preferred embodiment and provides a navigation assembly 5*m* comprising a mounting assembly 218*m* and a navigational device 10*m* having a display 26*m*. The mounting assembly is configured to mount within an open port 12*m* of an overhead console 36*m*, and the navigational device 10*m* is sized and configured to fixedly or removably attach to the mounting assembly 218*m*. In addition to the features described in the twelfth preferred embodiment, the mounting assembly 218*m* of the thirteenth preferred embodiment is operable to completely stow the navigational device 10*m* in the open port 12*m* in a first, stowed positioned, such that substantially none of the navigational device 10*m* is outside the open port 12*m* and substantially all of the display 26*m* is within the open port 12*m*.

To receive the navigational device 10*m* in the first, stowed position, the overhead console 36*m* and the mounting assembly 218*m* of the thirteenth preferred embodiment preferably have a larger height than the overhead console 36*l* and mounting assembly 218*l* of twelfth preferred embodiment, as illustrated in FIG. 34.

The mounting assembly 218*m* is also configured to permit the navigational device 10*m* to be linearly moved to a second, intermediate position (not shown), similar to the raised position of the twelfth preferred embodiment. In the second, intermediate position, approximately one-thirds of the navigational device 10*m* is positioned outside the open port 12*m*, such that only a lower portion 224*m* of the display 26*m* can be viewed.

The mounting assembly 218*m* is further configured to permit the navigational device 10*m* to be linearly moved to a third, lowered position (not shown), similar to the lowered position of the twelfth preferred embodiment. In the third, lowered position, approximately two-thirds of the navigational device 10*m* is positioned outside the open port 12*m*, such that substantially all of the display 26*m* can be viewed.

As with the twelfth preferred embodiment, the first, second, and third viewing positions of the navigational device 10*m* are all generally linear in relation to each other, including the first, stowed position. As such, the mounting assembly 218*m* is operable to raise and lower the navigational device 10*m* along a generally linear axis, and the navigational device 10*m* is not operable to pivot within the open port 12*m*.

The navigational device 10*m* is also operable to pivot left and right about a generally transverse axis in either the second or third viewing positions.

Although the invention has been described with reference to the preferred embodiment illustrated in the attached drawing figures, it is noted that equivalents may be employed and substitutions made herein without departing from the scope of the invention as recited in the claims. For example, the preferred embodiments may be combined to produce the navigational device 10 having various features. For example, the navigational device 10*b* may be removably mounted in the air vent unit 70*b*, or the navigational device 10*b* mounted in the air vent unit 70*b* may be operable to connect to the power source supplied by the vehicle. Additionally, a navigational device (not shown) sized and configured to fit within an open port (not shown) located elsewhere in the vehicle, such as in a rear seating area of a van, may be provided.

Further, as discussed above, the navigational device 10 is configured to be transferred between vehicles. As such, the navigational device 10 may be removably mounted in the vehicle using any mounting unit 76b,100,120',144h or the navigational device 10 may be sized and configured to fit within the open port 12, empty recess 14, or hollowed receptacle 16 of each vehicle, either using the mounting unit 120' or sizing the housing 30 of the navigational device 10 to fit snugly within the open port 12, empty recess 14, or hollowed receptacle 16.

Further yet, the navigational device 10 may also be permanently mounted in the open port 12, empty recess 14, or hollowed receptacle 16 using any conventional securing means (not shown), such as latches or screws.

Having thus described the preferred embodiment of the invention, what is claimed as new and desired to be protected by Letters Patent includes the following:

1. A navigation assembly sized and configured to fit within an open port of a vehicle resulting from removal of a non-navigation component, the navigation assembly comprising:
   a navigational device including—
     a navigation component,
     a processor coupled with the navigation component for calculating a location of the navigational device,
     a memory coupled with the processor for storing cartographic data,
     a display, and
     a portable housing for housing the navigation component, the processor, the memory, and the display; and
   a mounting assembly for mounting the housing within the open port and configured such that the housing may be linearly raised and lowered between at least two linear viewing positions, wherein in a first, raised position, about one-thirds to three fourths of the housing is positioned within the open port, and in a second, lowered position, about none to one-half of the housing is positioned within the open port, and further such that the housing may be pivoted left and right relative to the open port.

2. The navigation assembly as claimed in claim 1, wherein the non-navigational component was removed from an overhead console of the vehicle.

3. The navigation assembly as claimed in claim 2, wherein the non-navigational component was originally installed in the vehicle during manufacture of the vehicle.

4. A navigation assembly comprising:
   a navigational device including—
     a navigation component,
     a processor coupled with the navigation component for calculating a location of the navigational device,
     a memory coupled with the processor for storing cartographic data,
     a display; and
     a portable housing for housing the navigation component, the processor, the memory, and the display; and
   a mounting assembly mounted in an open port of a vehicle resulting from removal of a non-navigational component, the mounting assembly including a support plate riding up and down a generally linear stem to generally linearly raise and lower the housing among three generally linear viewing positions, such that in a first, stowed position, substantially all of the housing is within the open port, in a second, intermediate position, only a portion of the housing is within the open port, and in a third position, substantially none of the housing is within the open port.

5. The navigation assembly as claimed in claim 4, wherein the navigational device is operable to pivot left and right about a generally transverse axis.

6. The navigation assembly as claimed in claim 4, wherein the non-navigational component was removed from an overhead console of the vehicle.

7. The navigation assembly as claimed in claim 5, wherein the navigational device may be rotated about the generally transverse axis when the navigational device is in either the intermediate or third position.

* * * * *